United States Patent
Takimoto et al.

(10) Patent No.: US 7,262,587 B2
(45) Date of Patent: Aug. 28, 2007

(54) CIRCUIT AND METHOD FOR CONTROLLING DC-DC CONVERTER

(75) Inventors: Kyuichi Takimoto, Kasugai (JP); Hirofumi Dogome, Kasugai (JP); Takashi Matsumoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 10/981,792

(22) Filed: Nov. 5, 2004

(65) Prior Publication Data

US 2005/0275388 A1    Dec. 15, 2005

(30) Foreign Application Priority Data

Jun. 11, 2004    (JP) .............................. 2004-174675

(51) Int. Cl.
    *G05F 1/00*    (2006.01)
(52) U.S. Cl. ........................ 323/282; 323/222; 323/274
(58) Field of Classification Search ................ 323/282, 323/284, 285, 286, 222, 272, 274
    See application file for complete search history.

(56) References Cited

U.S. PATENT DOCUMENTS

| | | | | |
|---|---|---|---|---|
| 4,806,842 A | * | 2/1989 | Bittner ........................ | 323/222 |
| 5,610,503 A | * | 3/1997 | Fogg et al. .................. | 323/283 |
| 6,127,814 A | * | 10/2000 | Goder ......................... | 323/282 |
| 7,002,330 B2 | * | 2/2006 | Kitani et al. ................. | 323/284 |
| 7,019,507 B1 | * | 3/2006 | Dittmer et al. ............. | 323/284 |
| 2004/0046902 A1 | | 3/2004 | Yamasaki | |

FOREIGN PATENT DOCUMENTS

JP    3405871    7/2003

* cited by examiner

*Primary Examiner*—Bao Q. Vu
(74) *Attorney, Agent, or Firm*—Arent Fox LLP

(57) ABSTRACT

A control circuit for suppressing generation of inrush current during activation of a DC-DC converter, which controls output with control signals. The control circuit includes first and second error amplification circuits, each of which generates a control signal based on the difference between a reference voltage and voltage derived from an output voltage or an output current. During activation of the DC-DC converter, a soft start circuit generates a soft start signal having voltage lower than voltage of each control signal to control the output of the DC-DC converter. During activation of the DC-DC converter, a clamp circuit, which is connected to the first and second error amplification circuits, clamps the voltage of the first and second control signals to substantially the same voltage as the soft start signal.

27 Claims, 14 Drawing Sheets ered to an output terminal 1*a* of the DC-DC converter

CIRCUIT AND METHOD FOR CONTROLLING DC-DC CONVERTER

CROSS-REFERENCE TO RELATED APPLICATIONS

This application is based upon and claims the benefit of priority from prior Japanese Patent Application No. 2004-174675, filed on Jun. 11, 2004, the entire contents of which are incorporated herein by reference.

BACKGROUND OF THE INVENTION

The present invention relates to a control circuit for a DC-DC converter, and a semiconductor device, a DC-DC converter, and an electronic device.

A portable electronic device, such as a notebook personal computer, typically has an incorporated battery, which functions as a power supply for the device. The portable electronic device also has a built-in DC-DC converter. The DC-DC converter charges the battery with an external power supply, such as an AC adapter, which is connected to the portable electronic device. In many cases, a DC-DC converter used to perform charging, such as a DC-DC converter of constant voltage, constant current control type, which controls its output using a plurality of control signals (two control signals for constant voltage control and constant current control in this case). The present invention relates to a preferred structure for such a DC-DC converter that controls output using a plurality of control signals.

Japanese Patent No. 3405871 describes one example of this type of DC-DC converter. FIG. 1 is a schematic block diagram describing a conventional constant voltage, constant current control type DC-DC converter of Japanese Patent No. 3405871.

A DC-DC converter 1 includes a control circuit 2 for controlling the entire DC-DC converter 1. The control circuit 2 is provided with an operation signal ON for instructing start and stop operations for the DC-DC converter 1. The DC-DC converter 1 starts operating when the operation signal ON is high and stops operating when the operation signal ON is low.

The DC-DC converter 1 includes transistors Tr1 and Tr2, a coil L1, a diode D1, and capacitors C1 and C2. The transistor Tr1, which is connected to the control circuit 2, functions as a main switching transistor. The transistor Tr1, which receives a drive signal SG1 from the control circuit 2, is controlled so that it goes on and off in accordance with the drive signal SG1. The coil L1 is a choke coil for converting voltage. The transistor Tr2, which is connected to the control circuit 2, functions as a synchronous rectifier switch. The transistor Tr2 goes on when the transistor Tr1 is off to discharge the energy accumulated in the coil L1. The transistor Tr2, which receives a drive signal SG2 from the control circuit 2, is controlled to go on and off in accordance with the drive signal SG2. The diode D1 is formed by a flywheel diode connected to the coil L1. In the same manner as for the transistor Tr2, the diode D1 goes on when the transistor Tr1 is off to discharge the energy accumulated in the coil L1.

The capacitor C1 is a smoothing capacitor for smoothing the output of the DC-DC converter 1. A resistor Rs is connected to an output terminal 1*a* of the DC-DC converter 1. The resistor Rs is a current sense resistor, which is used to detect an output current Io of the DC-DC converter 1. A battery BT, which is a secondary battery, is connected to the output terminal 1*a* of the DC-DC converter 1. The capacitor C2 is connected between the control circuit 2 and the ground GND. The capacitor C2 is a soft start control capacitor, which suppresses generation of an inrush current from an input (input voltage Vi) during activation of the DC-DC converter 1. The input voltage Vi is a direct current voltage provided from an AC adaptor (not shown), which is connected to the DC-DC converter 1.

The control circuit 2 includes a voltage amplification circuit 3, first and second error amplification circuits 4 and 5, a PWM (pulse-width modulation) comparison circuit 6, a triangular waveform oscillator circuit 7, first and second output circuits 8 and 9 (Drv1 and Drv2 in the figure), and a power supply circuit 10.

The power supply circuit 10 controls the entire DC-DC converter 1 so that it goes on and off by controlling the supply of power to the entire control circuit 2 in accordance with an operation signal ON, which is provided from an external device. Resistors R1 and R2 are voltage dividing resistors for dividing an output voltage Vo of the DC-DC converter 1. The resistors R1 and R2 divide the output voltage Vo to generate voltage (divisional voltage) that is supplied to an inversion input terminal of the first error amplification circuit 4.

The first error amplification circuit 4 amplifies the voltage difference between the divisional voltage of the output voltage Vo supplied to the inversion input terminal and a reference voltage e1 supplied to the non-inversion input terminal. Then, the first error amplification circuit 4 supplies the amplified voltage to the PWM comparison circuit 6. The resistances of the resistors R1 and R2 are set so that the divisional voltage generated by the resistors R1 and R2 is equal to the reference voltage e1 when the value of the output voltage Vo of the DC-DC converter 1 is a value determined by a constant voltage operation of the DC-DC converter 1 (e.g., 12.6 V).

The voltage amplification circuit 3 is connected to the current sense resistor Rs. The voltage amplification circuit 3 amplifies voltage between the two terminals of the resistor Rs, which is generated by a current (i.e., an output current Io of the DC-DC converter 1) flowing through the current sense resistor Rs, and supplies the amplified voltage to an inversion input terminal of the second error amplification circuit 5. The second error amplification circuit 5 amplifies the voltage difference between the output voltage of the voltage amplification circuit 3 supplied to its inversion input terminal and a reference voltage e2 supplied to its non-inversion input terminal. The second error amplification circuit 5 then supplies the amplified voltage to the PWM comparison circuit 6. The reference voltage e2 is set in correspondence with the value (e.g., 3 A) of the output current Io determined by a constant current operation of the DC-DC converter 1.

The transistor Tr3, which is connected to the power supply circuit 10 and the capacitor C2, is controlled so that it goes on and off by the power supply circuit 10 in accordance with the operation signal ON. The transistor Tr3 is a switch circuit, which discharges charge accumulated in the capacitor C2 and sets the potential of the capacitor C2 to 0 V when the DC-DC converter 1 is not functioning. A constant current circuit 11 is connected to the transistor Tr3 and the capacitor C2. The constant current circuit 11 functions as a charging circuit, which charges the capacitor C2 and raises the potential of the capacitor C2 when the transistor Tr3 is off.

The PWM comparison circuit 6 has a first non-inversion input terminal connected to the first error amplification circuit 4, a second non-inversion input terminal connected to the second error amplification circuit 5, a third non-inversion input terminal connected to the capacitor C2, and an inversion input terminal connected to the triangular waveform oscillator circuit 7. The PWM comparison circuit 6 is a pulse width modulation circuit. In detail, the PWM comparison circuit 6 compares the lowest one of the voltages supplied to its non-inversion input terminals with the voltage provided to its inversion input terminal. Based on the comparison result, the PWM comparison circuit 6 outputs pulses when the voltage provided to the non-inversion input terminal is higher than the voltage provided to the inversion input terminal. The inversion input terminal of the PWM comparison circuit 6 is provided with a triangular waveform signal OSC1, which is oscillated at a constant frequency, from the triangular waveform oscillator circuit 7. The first non-inversion input terminal of the PWM comparison circuit 6 is provided with an output signal ERA1 of the first error amplification circuit 4. The second non-inversion input terminal is provided with an output signal ERA2 of the second error amplification circuit 5. The third non-inversion input terminal is provided with voltage between the two terminals of the capacitor C2 (soft start signal SS), which rises when the constant current circuit 11 performs charging.

The first output circuit 8 is connected to the PWM comparison circuit 6 and the transistor Tr1. The first output circuit 8 sets the transistor Tr1 to the on state when it is receiving pulses from the PWM comparison circuit 6. The second output circuit 9 is connected to the PWM comparison circuit 6 and the transistor Tr2. The second output circuit 9 is controlled by an output of the PWM comparison circuit 6. The second output circuit 9 sets the transistor Tr2 to the on state when the transistor Tr1 is off.

The DC-DC converter 1 feeds back the control circuit 2 with a detection result of the output voltage Vo and the output current Io to control an output pulse width of the PWM comparison circuit 6 (PWM control). In this way, the DC-DC converter 1 controls the output voltage Vo and the output current Io by controlling a ratio of an on-time Ton and an off-time Toff (on-off ratio) of the transistor Tr1.

The constant voltage operation and the constant current operation of the DC-DC converter 1 will now be described.

First, the constant voltage operation of the DC-DC converter 1 will be described, with reference to FIG. 2. The constant voltage operation is an operation mode for controlling the DC-DC converter 1 so that its output voltage Vo is maintained at a constant voltage (e.g., 12.6 V).

During the constant voltage operation of the DC-DC converter 1, voltage (divisional voltage) generated by the resistors R1 and R2 dividing the output voltage Vo is close to the reference voltage e1. During the constant voltage operation, the output current Io is smaller than current determined by the constant current operation, which will be described later. Thus, voltage generated by the voltage amplification circuit 3, which amplifies voltage generated from the current Io flowing through the current sense resistor Rs, is substantially smaller than the reference voltage e2. As a result, the output voltage of the second error amplification circuit 5 rises to as high as a value close to a maximum value. To be specific, the voltage of the output signal ERA2 of the second error amplification circuit 5 is higher than the voltage of the output signal ERA1 of the first error amplification circuit 4 as shown in FIG. 2. Thus, during the constant voltage operation, the PWM comparison circuit 6 controls its output pulses according to the output signal ERA1 of the first error amplification circuit 4.

Next, the constant current operation of the DC-DC converter 1 will be described, with reference to FIG. 3. The constant current operation is an operation mode for controlling the DC-DC converter 1 to have its output current Io maintained at a constant current (e.g., 3 A here).

During the constant current operation of the DC-DC converter 1, voltage generated by the voltage amplification circuit 3 amplifying voltage generated from the current (output current Io) flowing through the current sense resistor Rs is close to the reference current e2. During the constant current operation, the output voltage Vo is smaller than voltage determined by the constant voltage operation, which is described above. Thus, voltage generated by the resistors R1 and R2 dividing the output voltage Vo is substantially smaller than the reference voltage e1. As a result, the output voltage of the first error amplification circuit 4 rises to as high as a value close to a maximum value. To be specific, the voltage of the output signal ERA1 of the first error amplification circuit 4 is higher than the voltage of the output signal ERA2 of the second error amplification circuit 5 as shown in FIG. 3. Thus, during the constant current operation, the PWM comparison circuit 6 controls its output pulses according to the output signal ERA2 of the second error amplification circuit 5.

Next, the activation operation of the DC-DC converter 1 will be described.

When the DC-DC converter 1 is activated, the transistor Tr3 is turned off by the power supply circuit 10, and the capacitor C2 is charged by the constant current circuit 11. The voltage of the soft start signal SS gradually rises from 0 V as the capacitor C2 is charged. During activation of the DC-DC converter 1, the values of the output voltage Vo and the output current Io of the DC-DC converter 1 are substantially smaller than values determined by the reference voltages e1 and e2, respectively. Thus, voltage difference between the voltage (divisional voltage) generated by the resistors R1 and R2, which divide the output voltage Vo, and the reference voltage e1 is substantially maximum. Further, voltage difference between the output voltage of the voltage amplification circuit 3, which is generated by amplifying the voltage between the two terminals of the current sense resistor Rs, and the reference voltage e2 is substantially maximum. In other words, the voltages of the output signals ERA1 and ERA2 of the first and second error amplification circuits 4 and 5 are substantially maximum when activating the DC-DC converter 1.

The PWM comparison circuit 6 controls its output pulse width based on the one of these signals (SS, ERA1, and ERA2) having the lowest potential. To be specific, the PWM comparison circuit 6 outputs pulses having a pulse width proportional to the voltage of the soft start signal SS during activation of the DC-DC converter 1.

During activation of the DC-DC converter 1, the output voltages of the first and second error amplification circuits 4 and 5 are maximum. When assuming that the PWM comparison circuit 6 controls its output pulse width according to the output signal ERA1 or ERA2, the output pulse width is maximum (i.e., the on-time Ton of the transistor Tr1 is maximum), and an excessive current (inrush current) flows through the DC-DC converter 1. However, the PWM comparison circuit 6 actually controls its output pulse width according to the soft start signal SS during activation of the DC-DC converter 1 as described above. This suppresses generation of an excessive current (inrush current) from an input, which would otherwise flow through the DC-DC converter 1.

In other words, the DC-DC converter 1 uses the soft start signal SS during activation to limit the output pulse width of the PWM comparison circuit 6 and to shorten the on-time Ton of the transistor Tr1. This suppresses generation of an inrush current. After the voltage of the soft start signal SS rises as the capacitor C2 is charged until the output voltage Vo or the output current Io of the DC-DC converter 1 reaches its specified value, the DC-DC converter 1 executes constant voltage control in the above-described constant voltage mode, or constant current control in the above-described constant current mode.

However, the conventional DC-DC converter 1 described above has a shortcoming in that the DC-DC converter 1 fails to suppress generation of an inrush current when the control of its output (PWM control) is switched from the control using the soft start signal SS to the control using the output signal ERA1 of the first error amplification circuit 4 (constant voltage control) or to the control using the output signal ERA2 of the second error amplification circuit 5 (constant current control).

The generation of an inrush current will now be described with reference to FIG. 4.

FIG. 4 shows an operational waveform during activation of the DC-DC converter 1. First, the DC-DC converter 1 is activated at time t1. Then, the voltages of the output signals ERA1 and ERA2 of the first and second error amplification circuits 4 and 5 are set substantially at the maximum voltage Vmax.

The voltage of the soft start signal SS gradually rises from 0 V as the capacitor C2 is charged. The voltage of the soft start signal SS finally exceeds the voltage of the triangular waveform signal OSC1 at time t2. Then, the PWM comparison circuit 6 outputs pulses having a pulse width according to the voltage of the soft start signal SS. Afterwards, the output voltage Vo and the output current Io of the DC-DC converter 1 gradually rise in proportion to the on-time Ton of the transistor Tr1, which is controlled to go on and off by the output pulses of the PWM comparison circuit 6.

At time t3, the output current Io reaches the value (e.g., 3 A here) determined by the constant current operation (specifically, the output voltage of the voltage amplification circuit 3 reaches the reference voltage e2). Then, the voltage of the output signal ERA2 of the second error amplification circuit 5 falls to a control voltage Vct for maintaining the output current Io at a constant current of 3 A.

However, the voltage of the output signal ERA2 in this state does not reach the control voltage Vct immediately. The voltage of the output signal ERA2 falling from the maximum voltage Vmax to the control voltage Vct requires a response delay time according to an RC (resistance-capacitance) time constant, which is set for the second error amplification circuit 5 (time indicated by t4-t3 in FIG. 4).

The voltage of the soft start signal SS continues to rise from when the voltage of the output signal ERA2 starts falling to when the voltage of the output signal ERA2 reaches the control voltage Vct. This extends the on-time Ton of the transistor Tr1 so that the output voltage Vo continues to rise further. As a result, an inrush current is generated (i.e., the output current Io larger than the current (3 A) determined by the control voltage Vct is generated) in a period from when the voltage of the output signal ERA2 starts falling to when the DC-DC converter 1 switches to the constant current control (i.e., to when the voltage of the output signal ERA2 reaches the control voltage Vct).

Such an inrush current is generated not only when the output control of the DC-DC converter 1 (PWM control) is switched from the control using the soft start signal SS to the constant current control, but also when the output control is switched from the control using the soft start signal SS to the constant voltage control. In this way, the conventional configuration fails to suppress generation of an inrush current during activation of the DC-DC converter.

SUMMARY OF THE INVENTION

The present invention provides a control circuit, a control method, a semiconductor device, a DC-DC converter, and an electronic device that suppress generation of an inrush current during activation of the DC-DC converter, which controls output using a plurality of control signals.

One aspect of the present invention is a control circuit for controlling output of a DC-DC converter with a plurality of control signals. The control circuit includes a plurality of error amplification circuits, each generating a control signal based on a difference between a reference voltage and voltage derived from an output that is to be controlled. A soft start circuit generates a soft start signal. The soft start signal has voltage lower than voltage of each of the control signals and is used to control the output of the DC-DC converter when the DC-DC converter is activated. A clamp circuit connected to the error amplification circuits clamps the voltage of each of the control signals to substantially the same voltage as the soft start signal when the DC-DC converter is activated.

A further aspect of the present invention is a control circuit for controlling output of a DC-DC converter with a plurality of control signals. The control circuit includes a plurality of error amplification circuits, each generating a control signal based on a difference between a reference voltage and voltage derived from an output that is to be controlled. A soft start circuit generates a soft start signal. The soft start signal has voltage lower than voltage of each of the control signals and is used to control the output of the DC-DC converter when the DC-DC converter is activated. A clamp circuit connected to the error amplification circuits clamps the voltage of each of the control signals to voltage greater than that of the soft start signal by a predetermined amount when the DC-DC converter is activated.

Another aspect of the present invention is a semiconductor device for controlling output of a DC-DC converter or an AC-DC converter with a plurality of control signals. The semiconductor device is connected to a capacitor. The semiconductor device includes a plurality of error amplification circuits, each generating a control signal based on a difference between a reference voltage and voltage derived from an output that is to be controlled. A soft start circuit charges the capacitor during operation of the DC-DC converter or the AC-DC converter and generates a soft start signal having voltage equal to that between two terminals of the capacitor. The soft start signal has voltage lower than voltage of each of the control signals and is used to control the output of the DC-DC converter when the DC-DC converter is activated. A clamp circuit, connected to the error amplification circuits, clamps the voltage of each of the control signals to substantially the same voltage as the soft start signal when the DC-DC converter is activated.

A further aspect of the present invention is a DC-DC converter including a control circuit for controlling output of the DC-DC converter with a plurality of control signals. The control circuit includes a plurality of error amplification circuits, each generating a control signal based on a difference between a reference voltage and voltage derived from an output that is to be controlled. A soft start circuit generates a soft start signal. The soft start signal has voltage lower than voltage of each of the control signals and is used to control the output of the DC-DC converter when the DC-DC converter is activated. A clamp circuit connected to the error amplification circuits clamps the voltage of each of the control signals to substantially the same voltage as the soft start signal when the DC-DC converter is activated.

Another aspect of the present invention is a battery pack provided with a DC-DC converter including a control circuit for controlling output of the DC-DC converter with a plurality of control signals, and a battery connected to and charged by the DC-DC converter. The control circuit includes a plurality of error amplification circuits, each generating a control signal based on a difference between a reference voltage and voltage derived from an output that is to be controlled. A soft start circuit generates a soft start signal. The soft start signal has voltage lower than voltage of each of the control signals and is used to control the output of the DC-DC converter when the DC-DC converter is activated. A clamp circuit connected to the error amplification circuits clamps the voltage of each of the control signals to substantially the same voltage as the soft start signal when the DC-DC converter is activated.

A further aspect of the present invention is an electronic device provided with a DC-DC converter including a control circuit for controlling output of the DC-DC converter with a plurality of control signals. The control circuit includes a plurality of error amplification circuits, each generating a control signal based on a difference between a reference voltage and voltage derived from an output that is to be controlled. A soft start circuit generates a soft start signal. The soft start signal has voltage lower than voltage of each of the control signals and is used to control the output of the DC-DC converter when the DC-DC converter is activated. A clamp circuit connected to the error amplification circuits clamps the voltage of each of the control signals to substantially the same voltage as the soft start signal when the DC-DC converter is activated.

Another aspect of the present invention is a method for controlling output of a DC-DC converter with a plurality of control signals. The method includes generating a plurality of control signals based on a difference between a reference voltage and voltage derived from an output that is to be controlled, generating a soft start signal having voltage lower than voltage of each of the control signals and being used to control the output of the DC-DC converter when the DC-DC converter is activated, and clamping the voltage of each of the control signals to substantially the same voltage as the soft start signal when the DC-DC converter is activated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
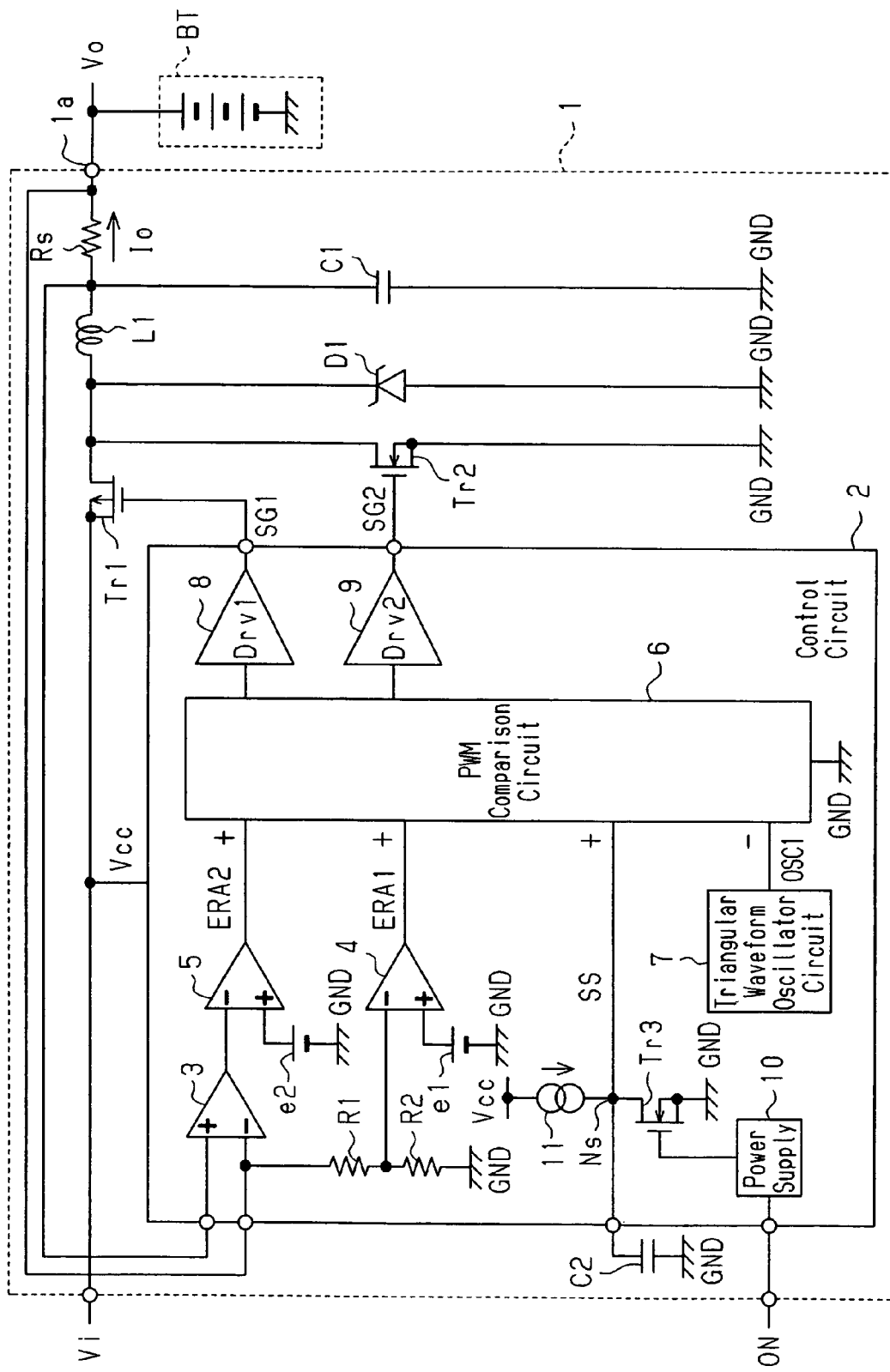
FIG. 1 is a schematic block diagram of a conventional DC-DC converter.
Figure 2:
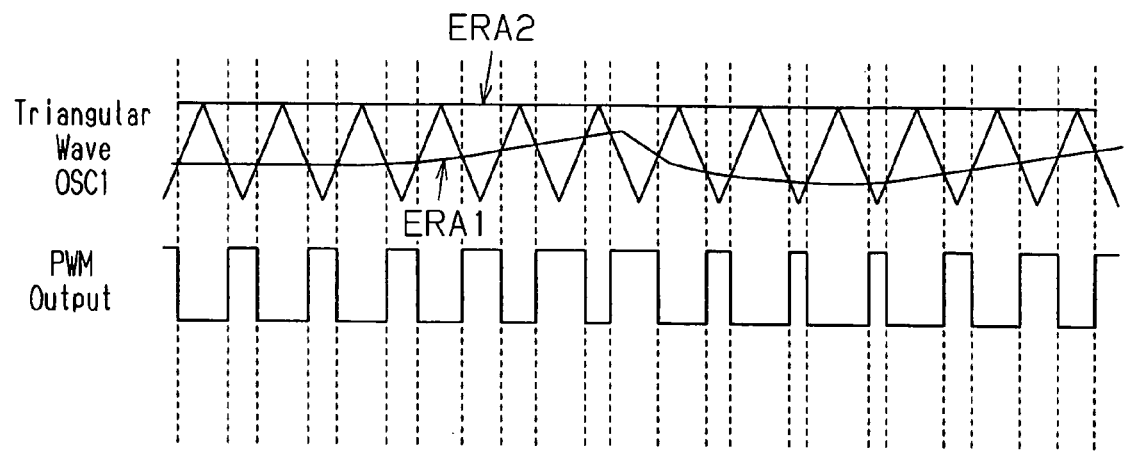
FIG. 2 is voltage waveform diagram of the DC-DC converter of FIG. 1 during a constant voltage operation.
Figure 3:
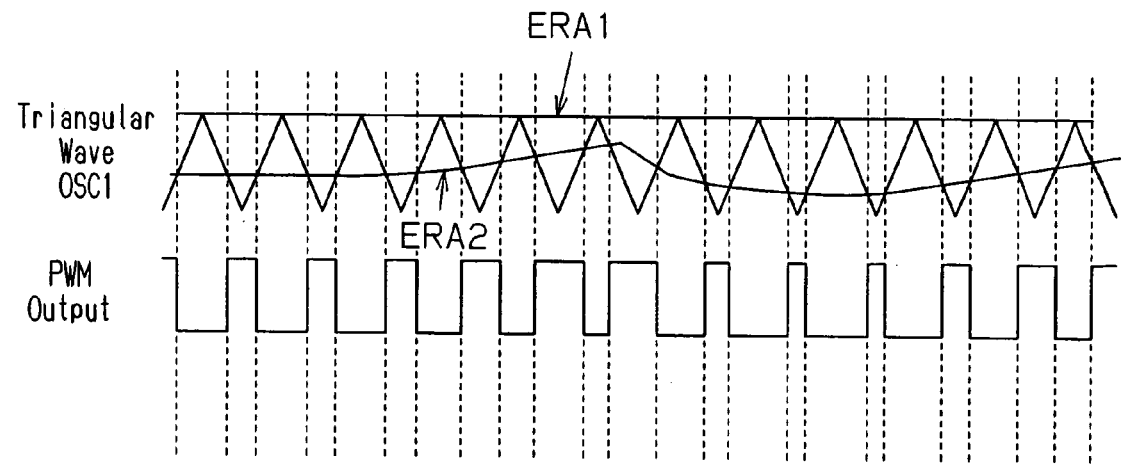
FIG. 3 is voltage waveform diagram of the DC-DC converter of FIG. 1 during a constant current operation.
Figure 4:
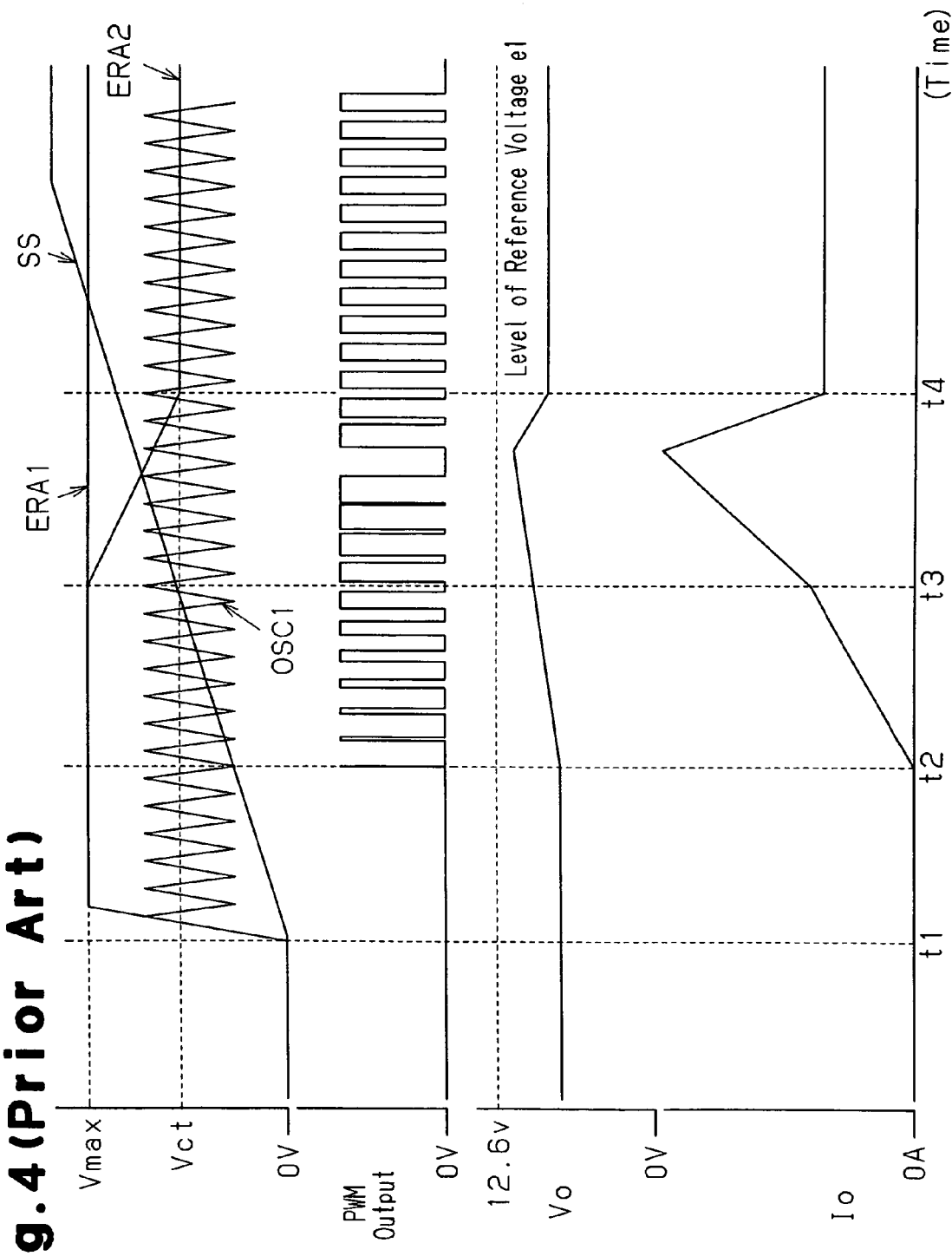
FIG. 4 is an operational waveform diagram of the DC-DC converter of FIG. 1.

In the drawings, like numerals are used for like elements throughout.

First Embodiment

A DC-DC converter 21 and an electronic device 12 according to a first embodiment of the present invention will now be described with reference to FIGS. 5 to 7.

Figure 7:
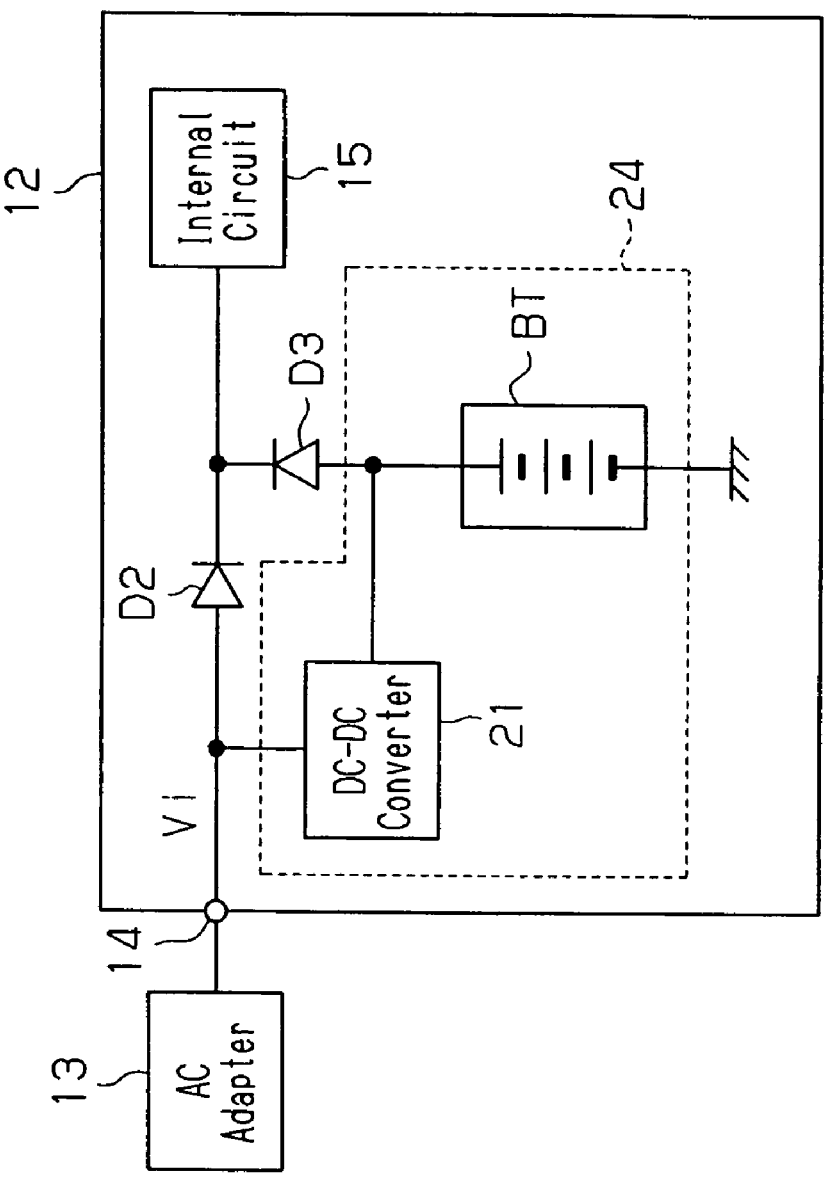
FIG. 7 is a schematic block diagram of an electronic device on which the DC-DC converter of FIG. 5 is mounted.

FIG. 7 is a schematic block diagram of the electronic device 12. The electronic device 12 is, for example, a portable electronic device, such as a notebook personal computer. The electronic device 12 has a connection terminal 14, which is connected to an AC adaptor 13 and is supplied with direct current input voltage Vi from the AC adaptor 13.

The electronic device 12 includes an internal circuit 15, a battery BT, the DC-DC converter 21, and diodes D2 and D3. The battery BT includes a plurality of secondary batteries. The battery BT supplies the internal circuit 15 with operation power supply voltage when the AC adaptor 13 is not connected to the electronic device 12. The internal circuit 15 provides various functions to the user of the electronic device 12. The DC-DC converter 21 functions as a charging circuit for charging the battery BT using the input voltage Vi from the AC adaptor 13.

The connection terminal 14 is connected to the anode of the diode D2. The cathode of the diode D2 is connected to the internal circuit 15. A connection terminal of the internal circuit 15 is connected to the cathode of the diode D3. The anode of the diode D3 is connected to the battery BT. Each of the two diodes D2 and D3 functions as a reverse flow prevention circuit. The internal circuit 15 receives the input voltage Vi from the AC adaptor 13, or an output voltage of the battery BT, and operates with the received voltage.

The DC-DC converter 21 is supplied with the input voltage Vi from the AC adaptor 13. The DC-DC converter 21 is a voltage conversion circuit for raising or lowering the input voltage Vi to generate an output voltage Vo. The battery BT is charged with the output voltage Vo. The DC-DC converter 21 may be incorporated in the electronic device 12. Alternatively, a battery pack 24, which includes the DC-DC converter 21 formed integrally with the battery BT, may be detachably attached to the electronic device 12.

Figure 5:
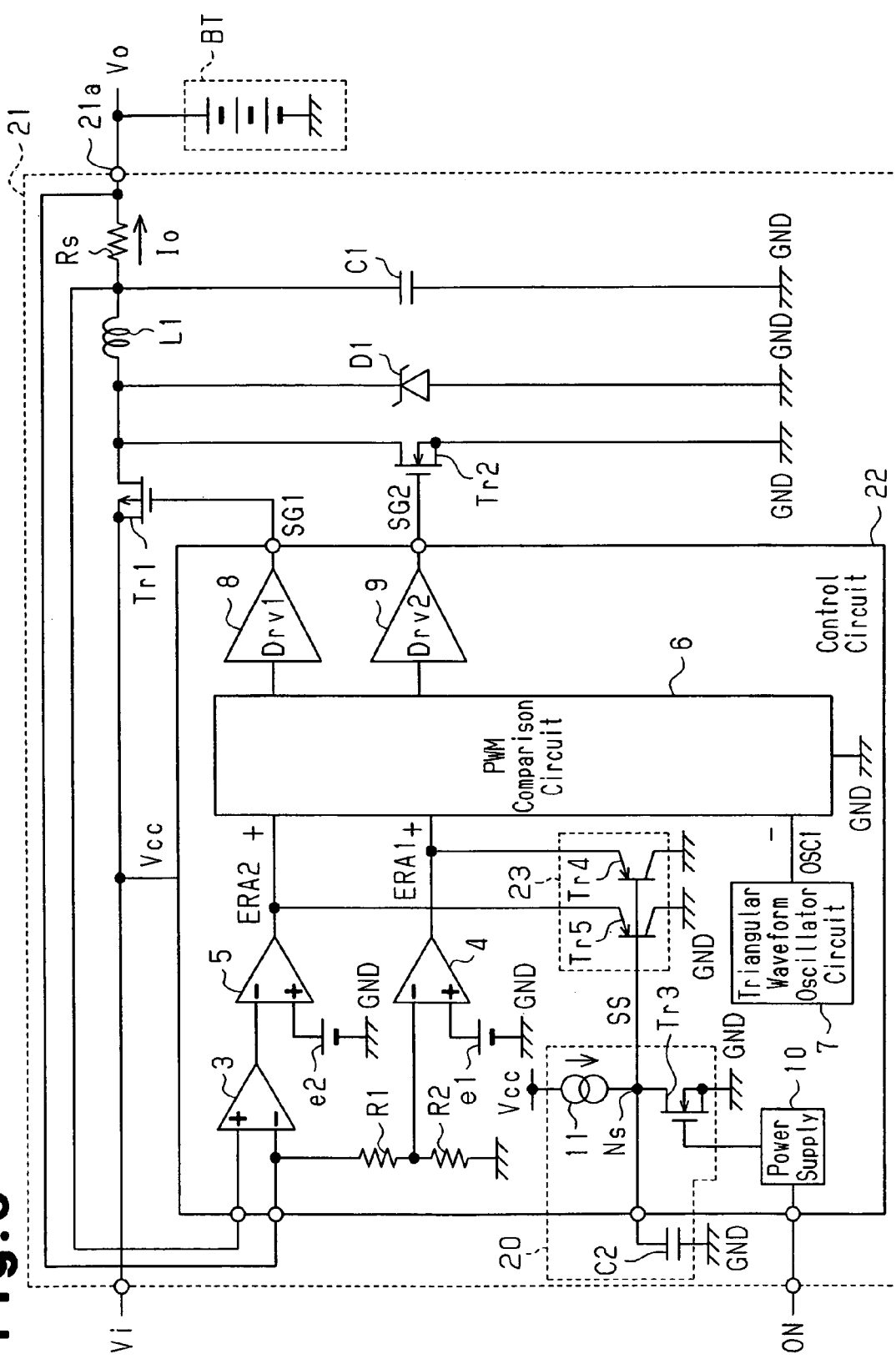
FIG. 5 is a schematic block diagram of a DC-DC converter according to a first embodiment of the present invention.

FIG. 5 is a schematic diagram of the DC-DC converter 21. In FIG. 5, components that are the same as the components of the prior art shown in FIG. 1 are given the same reference numerals.

The DC-DC converter 21 of the first embodiment is a step-down voltage DC-DC converter of constant voltage, constant current control type. The DC-DC converter 21 has an output terminal 21a, to which the battery BT that is a load is connected.

The DC-DC converter 21 includes a control circuit 22, which controls the entire DC-DC converter 21 by feedback controlling output values of the DC-DC converter 21 (in the first embodiment, an output voltage Vo and an output current Io described later). The control circuit 22 receives an operation signal ON for instruction to stop and start the operation of the DC-DC converter 21. The DC-DC converter 21 starts operating when the operation signal ON is high, and stops operating when the operation signal ON is low.

The DC-DC converter 21 includes the control circuit 22, capacitors C1 and C2, a diode D1, transistors Tr1 and Tr2, a choke coil L1, and a current sense resistor Rs. The transistor Tr1 functions as a main switching transistor for driving the load (battery BT). The transistor Tr1 is a PMOS-FET (P-channel metal oxide silicon field effect transistor) in the first embodiment. The transistor Tr1 has a gate terminal to which a drive signal SG1 for controlling on and off of the transistor Tr1 is provided from the control circuit 22, and a source terminal to which input voltage Vi is supplied from the AC adaptor 13 (see FIG. 7). The transistor Tr1 further has a drain terminal connected to the choke coil L1 for voltage conversion.

The transistor Tr2 functions as a synchronous rectifier switch. The transistor Tr2 switches to the on state when the transistor Tr1 is off to discharge the energy accumulated in the choke coil L1. The transistor Tr2 is an NMOS-FET (N-channel metal oxide silicon field effect transistor) in the first embodiment. The transistor Tr2 has a gate terminal to which a drive signal SG2 for controlling on and off of the transistor Tr2 is provided from the control circuit 22. The transistor Tr2 further has a source terminal connected to the ground GND, and a drain terminal connected to the drain terminal of the transistor Tr1.

The drain terminal of the transistor Tr1 is connected to the output terminal 21a via the choke coil L1 and the current sense resistor Rs. The current sense resistor Rs is used to detect the output current Io of the DC-DC converter 21. The drain terminal of the transistor Tr1 is connected to the cathode of the diode (flywheel diode) D1. The anode of the diode D1 is connected to the ground GND. The flywheel diode D1 goes on when the transistor Tr1 is off to discharge the energy accumulated in the choke coil L1.

A connecting node between the choke coil L1 and the current sense resistor Rs is connected to the ground GND via the capacitor C1. The capacitor C1 is a smoothing capacitor for smoothing the output of the DC-DC converter 21. The capacitor C2 is externally connected to the control circuit 22.

The capacitor C2 is a soft start control capacitor for suppressing generation of an inrush current from the input voltage Vi when the DC-DC converter 21 starts operating (during activation of the DC-DC converter 21).

The control circuit 22 is a single chip semiconductor, which includes a voltage amplification circuit 3, first and second error amplification circuits 4 and 5, a PWM comparison circuit 6, a triangular waveform oscillator circuit 7, first and second output circuits 8 and 9 (Drv1 and Drv2), a power supply circuit 10, and transistors Tr4 and Tr5.

The power supply circuit 10 receives an operation signal ON and controls the power supply of the entire control circuit 22 according to the operation signal ON. In this way, the power supply circuit 10 controls on and off activation of the entire DC-DC converter 21. The resistors R1 and R2 are voltage dividing resistors for dividing the output voltage Vo of the DC-DC converter 21. The voltage (divisional voltage) generated by the resistors R1 and R2 dividing the output voltage Vo is supplied to an inversion input terminal of the first error amplification circuit 4.

The first error amplification circuit 4 amplifies voltage difference between the voltage provided to its inversion input terminal (i.e., the divisional voltage generated by the resistors R1 and R2) and a reference voltage e1 provided to its non-inversion input terminal, and outputs the amplified voltage. The resistances of the resistors R1 and R2 are set so that the divisional voltage generated by the resistors R1 and R2 is equal to the reference voltage e1 when the value of the output voltage Vo is a value (12.6 V in the first embodiment) determined by a constant voltage operation of the DC-DC converter 21.

The voltage amplification circuit 3 is connected to the current sense resistor Rs. The voltage amplification circuit 3 amplifies voltage between the two terminals of the resistor Rs, which is generated by the current flowing through the current sense resistor Rs (i.e., the output current Io of the DC-DC converter 1), and provides the amplified voltage to an inversion input terminal of the second error amplification circuit 5. The second error amplification circuit 5 amplifies the voltage difference between the output voltage of the voltage amplification circuit 3 provided to its inversion input terminal and a reference voltage e2 provided to its non-inversion input terminal and outputs the amplified voltage. The reference voltage e2 is set in correspondence with the value (3 A in the first embodiment) of the output current Io determined by a constant current operation of the DC-DC converter 21.

The transistor Tr3, which is connected to the power supply circuit 10 and the capacitor C2, functions as a switch circuit. When the DC-DC converter 21 stops functioning, the transistor Tr3 discharges the capacitor C2 and sets the potential of the capacitor C2 to 0 V. When the DC-DC converter 21 is operating, the transistor Tr3 charges the capacitor C2 and raises the potential of the capacitor C2. The transistor Tr3 is an NMOS-FET (N-channel metal oxide silicon field effect transistor) in the first embodiment. The transistor Tr3 has a gate terminal connected to the power supply circuit 10, a source terminal connected to the ground GND, and a drain terminal connected to the constant current circuit 11. A connecting node Ns between the drain terminal of the transistor Tr3 and the constant current circuit 11 is connected to the ground GND via the capacitor C2.

In the first embodiment, the transistor Tr3 is controlled to go on and off by the power supply circuit 10 according to the operation signal ON. In detail, the transistor Tr3 is turned off when the DC-DC converter 21 is activated based on the operation signal ON. The transistor Tr3 is turned on when the DC-DC converter 21 stops functioning based on the operation signal ON. To be specific, the capacitor C2 is discharged when the DC-DC converter 21 stops operating, and the capacitor C2 is charged by the constant current circuit 11 when the DC-DC converter 21 is operating. The potential of the connecting node Ns that rises along with charging of the capacitor C2 (i.e., the voltage between the two terminals of the capacitor C2) is used as a soft start signal SS. In the first embodiment, the capacitor C2 which is an external capacitance, the constant current circuit 11, and the transistor Tr3 form a soft start circuit 20.

The transistor Tr4 (clamp element) is a PNP bipolar transistor in the first embodiment. The transistor Tr4 has a base terminal connected to the connecting node Ns, a collector terminal connected to the ground GND, and an emitter terminal connected to an output terminal of the first error amplification circuit 4. Thus, an emitter voltage Ve1 of the transistor Tr4 is voltage obtained by adding a base-emitter voltage Vbe1 of the transistor Tr4 to the voltage of the soft start signal SS, which is supplied to its base terminal.

The transistor Tr5 (clamp element) is a PNP bipolar transistor in the first embodiment. The transistor Tr5 has a base terminal connected to the connecting node Ns, a collector terminal connected to the ground GND, and an emitter terminal connected to an output terminal of the second error amplification circuit 5. Thus, an emitter voltage Ve2 of the transistor Tr5 is voltage obtained by adding a base-emitter voltage Vbe2 of the transistor Tr5 to the voltage of the soft start signal SS, which is provided to its base terminal. In the first embodiment, these two clamp elements (i.e., the transistor Tr4 and the transistor Tr5) configure a clamp circuit 23.

The PWM comparison circuit 6 has a first non-inversion input terminal connected to the first error amplification circuit 4 and the transistor Tr4, a second non-inversion input terminal connected to the second error amplification circuit 5 and the transistor Tr5, and an inversion input terminal connected to the triangular waveform oscillator circuit 7. The PWM comparison circuit 6 is a voltage pulse width modulation circuit. In detail, the PWM comparison circuit 6 compares voltage supplied to its inversion input terminal with the lower one of the voltages of the signals supplied to its two non-inversion input terminals (voltage comparison). As a result of this comparison, the PWM comparison circuit 6 outputs pulses when the voltage of the signal provided to the non-inversion input terminal is higher than the voltage of the signal provided to the inversion input terminal.

In detail, the inversion input terminal of the PWM comparison circuit 6 is provided with a triangular waveform signal OSC1, which is oscillated at a constant frequency, from the triangular waveform oscillator circuit 7. The first non-inversion input terminal is provided with an output signal ERA1 (control signal) of the first error amplification circuit 4. The second non-inversion input terminal is provided with an output signal ERA2 (control signal) of the second error amplification circuit 5.

The PWM comparison circuit 6 compares the voltage of the output signal ERA1 with the voltage of the triangular waveform signal OSC1 when the voltage of the output signal ERA1 is lower than the voltage of the output signal ERA2. When the voltage of the output signal ERA1 is higher than the voltage of the triangular waveform signal OSC1, the PWM comparison circuit 6 outputs pulses having a pulse width that is in accordance with the voltage of the output signal ERA1. The PWM comparison circuit 6 compares the voltage of the output signal ERA2 with the voltage of the triangular waveform signal OSC1 when the voltage of the output signal ERA2 is lower than the voltage of the output signal ERA1. When the voltage of the output signal ERA2 is higher than the voltage of the triangular waveform signal OSC1, the PWM comparison circuit 6 outputs pulses having a pulse width that is in accordance with the voltage of the output signal ERA2.

The first output circuit 8 is connected to the PWM comparison circuit 6 and the transistor Tr1. The first output circuit 8 sets the transistor Tr1 to the on state when it is receiving pulses from the PWM comparison circuit 6. The second output circuit 9 is connected to the PWM comparison circuit 6 and the transistor Tr2. The second output circuit 9 is controlled by the output of the PWM comparison circuit 6. The second output circuit 9 sets the transistor Tr2 to the on state when the transistor Tr1 is off.

The operation of the DC-DC converter 21 will now be described.

Figure 6:
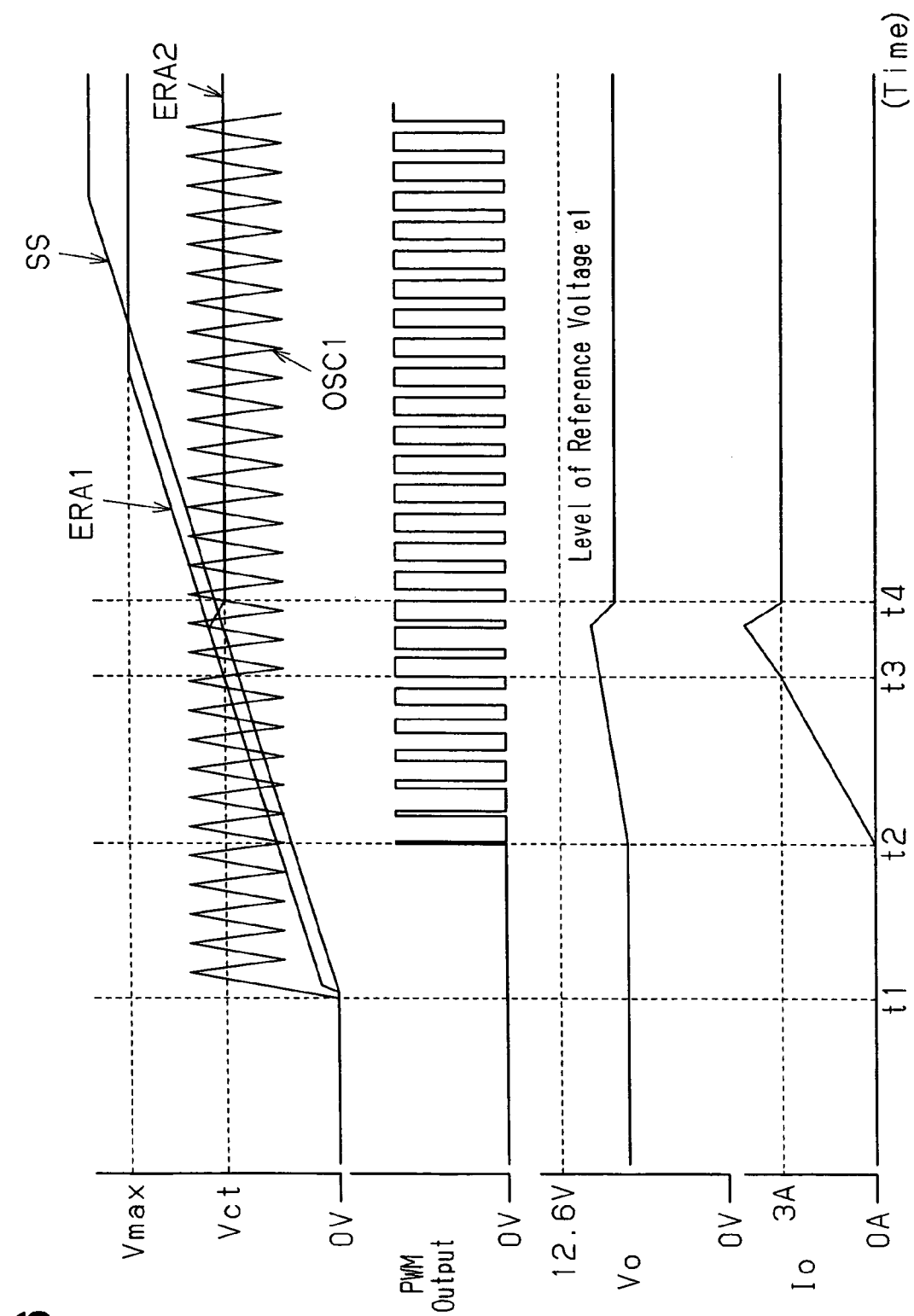
FIG. 6 is an operational waveform diagram of the DC-DC converter of FIG. 5.

FIG. 6 is a waveform diagram showing the operation of the DC-DC converter 21 when activated. First, the DC-DC converter 21 is activated at time t1. Then, the voltage of the soft start signal SS gradually rises from 0 V as the capacitor C2 is charged by the constant current circuit 11.

During activation of the DC-DC converter 21, the output voltage Vo of the DC-DC converter 21 is substantially smaller than the voltage (12.6 V here) determined by the constant voltage operation. Further, the voltage difference between the divisional voltage, which is generated by dividing the output voltage Vo with the resistors R1 and R2, and the reference voltage e1 is substantially maximum. In the DC-DC converter 21, however, the output voltage (ERA1) of the first error amplification circuit 4 is not set at a value generated based on the voltage difference between the divisional voltage and the reference voltage e1 (a voltage value close to a maximum voltage Vmax), but is clamped to the emitter voltage Ve1 of the transistor Tr4, which is generated based on the voltage of the soft start signal SS. In other words, the voltage of the output signal ERA1 of the first error amplification circuit 4 is set at a voltage obtained by adding the base-emitter voltage Vbe1 of the transistor Tr4 to the voltage of the soft start signal SS, which is supplied to the base terminal of the transistor Tr4.

During activation of the DC-DC converter 21, the output current Io of the DC-DC converter 21 is substantially smaller than the current (3 A here) determined by the constant current operation. The voltage difference between the output voltage of the voltage amplification circuit 3, which is generated by amplifying the voltage between the two terminals of the current sense resistor Rs, and the reference voltage e2 is substantially maximum. In the DC-DC converter 21, however, the output voltage of the second error amplification circuit 5 is not set at the voltage generated based on the voltage difference between the output voltage of the voltage amplification circuit 3 and the reference voltage e2 (a voltage value close to the maximum voltage Vmax), but is clamped to the emitter voltage Ve2 of the transistor Tr5, which is generated based on the voltage of the soft start signal SS. In other words, the voltage of the output signal ERA2 of the second error amplification circuit 5 is set at a voltage obtained by adding the base-emitter voltage Vbe2 of the transistor Tr5 to the voltage of the soft start signal SS, which is provided to the base terminal of the transistor Tr5.

Thus, during activation of the DC-DC converter 21, the voltages of the output signals ERA1 and ERA2 of the error amplification circuits 4 and 5 gradually rise from 0 V (more specifically, from the base-emitter voltages Vbe1 and Vbe2) in accordance with the voltage of the soft start signal SS.

Afterwards, the voltages of the output signals ERA1 and ERA2 of the first and second error amplification circuits 4 and 5, which are respectively clamped to the emitter voltages Vbe1 and Vbe2 of the transistors Tr4 and Tr5 based on the soft start signal SS, exceed the voltage of the triangular waveform signal OSC1 at time t2. The PWM comparison circuit 6 then starts outputting pulses. To be specific, the PWM comparison circuit 6 controls the pulse width of the output pulses in accordance with the output signals ERA1 and ERA2 of the error amplification circuits 4 and 5 that has a lower voltage. The output pulses of the PWM comparison circuit 6 control the transistor Tr1 so that it goes on and off. The output voltage Vo and the output current Io rise in proportion to the on-time TON (on/off ratio) of the transistor Tr1.

At time t3, the output current Io reaches the current value (3 A here) determined by the constant current operation (i.e., the output voltage of the voltage amplification circuit 3 reaches the reference voltage e2). The voltage of the output signal ERA2 of the second error amplification circuit 5 shifts to a control voltage Vct for controlling the output current Io to be a constant current value (3 A). In the first embodiment, the voltage of the output signal ERA2 is clamped to substantially the same voltage as the voltage of the soft start signal SS. Thus, the voltage of the output signal ERA2 promptly shifts to the control voltage Vct. A delay time required by the voltage of the output signal ERA2 to shift to the control voltage Vct (t4-t3 in FIG. 6) is only subtle. Thus, an inrush current generated during this period (during activation of the DC-DC converter 21) is suppressed to a minimum (actually almost no inrush current is generated).

The above describes a case in which the output control of the DC-DC converter 21 (specifically the control of the output pulse width of the PWM comparison circuit 6) is switched from the control using the soft start signal SS to the constant current control. Generation of an inrush current is also suppressed in the case where the output control of the DC-DC converter 21 is switched from the control using the soft start signal SS to the constant voltage control.

As described above, the DC-DC converter 21 and the electronic device 12 of the first embodiment has the advantages described below.

(1) The control circuit 22 of the DC-DC converter 21 includes the transistors Tr4 and Tr5 (clamp elements), which clamp the voltages of the output signals ERA1 and ERA2 of the first and second error amplification circuits 4 and 5 to substantially the same voltages as the voltage of the soft start signal SS during activation of the DC-DC converter 21. Thus, the DC-DC converter 21 suppresses generation of an inrush current when the output control (PWM control) of the DC-DC converter 21 is switched from the control using the soft start signal SS to the constant current control using the output signal ERA2 (or to the constant voltage control using the output signal ERA1) during activation.

(2) The DC-DC converter 21 promptly shifts the output control of the DC-DC converter 21 during activation from the control using the soft start signal SS to the constant current control without delay.

(3) The DC-DC converter 21 is configured by adding the two transistors Tr4 and Tr5, which function as clamp elements, to the structure of a conventional DC-DC converter. Thus, the control circuit 22 of the DC-DC converter 21, which features inrush current suppression during activation, is realized with a simple structure while minimizing costs.

(4) The electronic device 12 includes the DC-DC converter 21 for charging the battery BT. Thus, the electronic device 12 suppresses generation of an inrush current during activation of the DC-DC converter 21.

Second Embodiment

A DC-DC converter 31 according to a second embodiment of the present invention will now be described with reference to FIG. 8.

Figure 8:
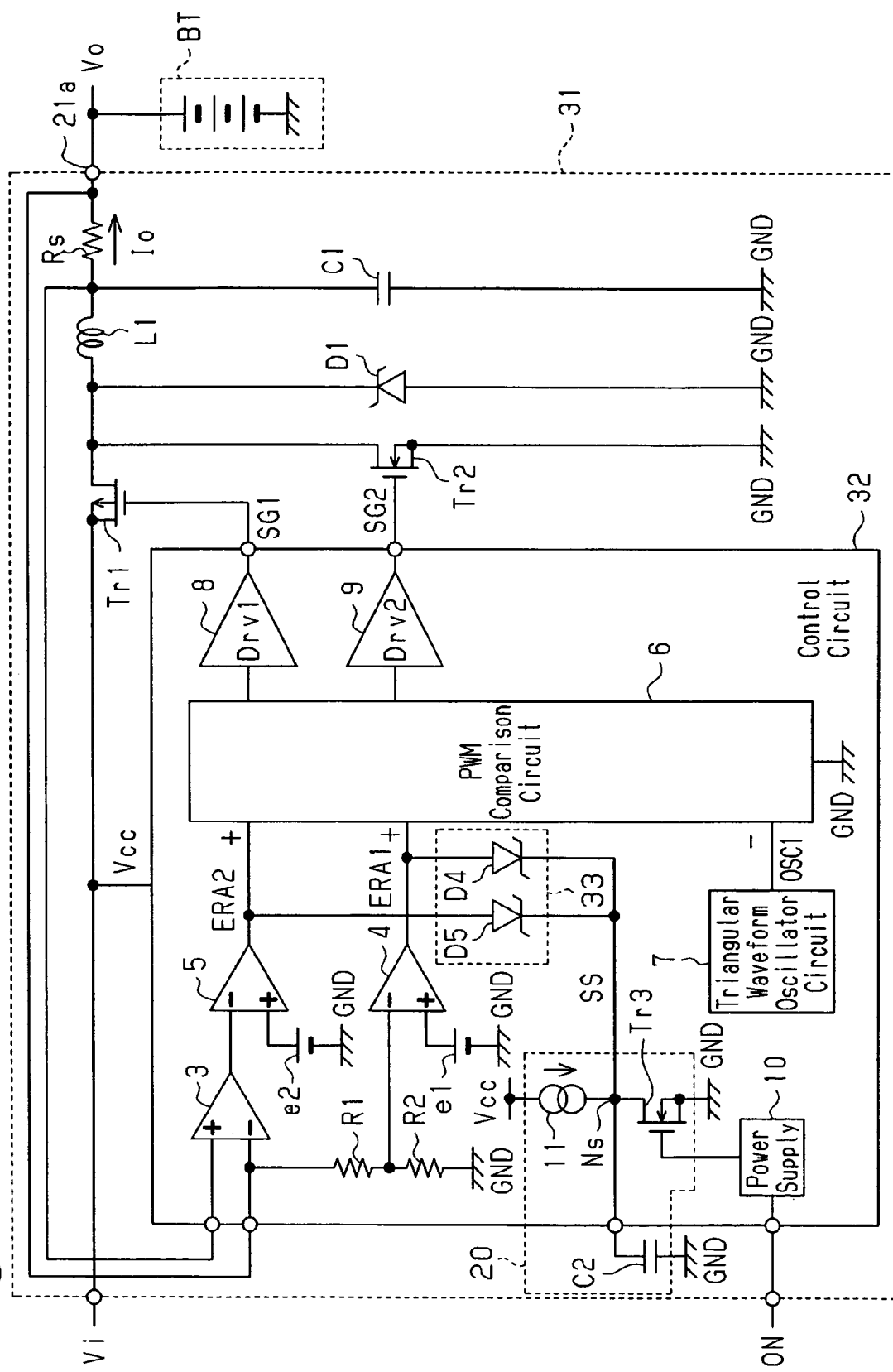
FIG. 8 is a schematic block diagram of a DC-DC converter according to a second embodiment of the present invention.

The DC-DC converter 31 of the second embodiment shown in FIG. 8 differs from the DC-DC converter 21 of the first embodiment in that a clamp circuit (specifically clamp elements forming the clamp circuit) is configured by diodes D4 and D5 in a control circuit 32. The other components of the DC-DC converter 31 are the same as the corresponding components in the first embodiment.

The diodes D4 and D5 are Schottky barrier diodes in the second embodiment. The cathode of each of the diodes D4 and D5 (clamp elements) is connected to the connecting node Ns between the constant current circuit 11 and the transistor Tr3. The anode of the diode D4 is connected to the output terminal of the first error amplification circuit 4. The anode of the diode D5 is connected to the output terminal of the second error amplification circuit 5.

During activation of the DC-DC converter 31 in this configuration, the voltages of the output signals ERA1 and ERA2 of the first and second error amplification circuits 4 and 5 are clamped to voltages higher than the voltage of the soft start signal SS by threshold voltages of the diodes D4 and D5, respectively. Thus, the DC-DC converter 31 of the second embodiment, which includes a clamp circuit 33 formed by the diodes D4 and D5, has the same advantages as the DC-DC converter 21 of the first embodiment.

Third Embodiment

A DC-DC converter 41 according to a third embodiment of the present invention will now be described with reference to FIG. 9.

Figure 9:
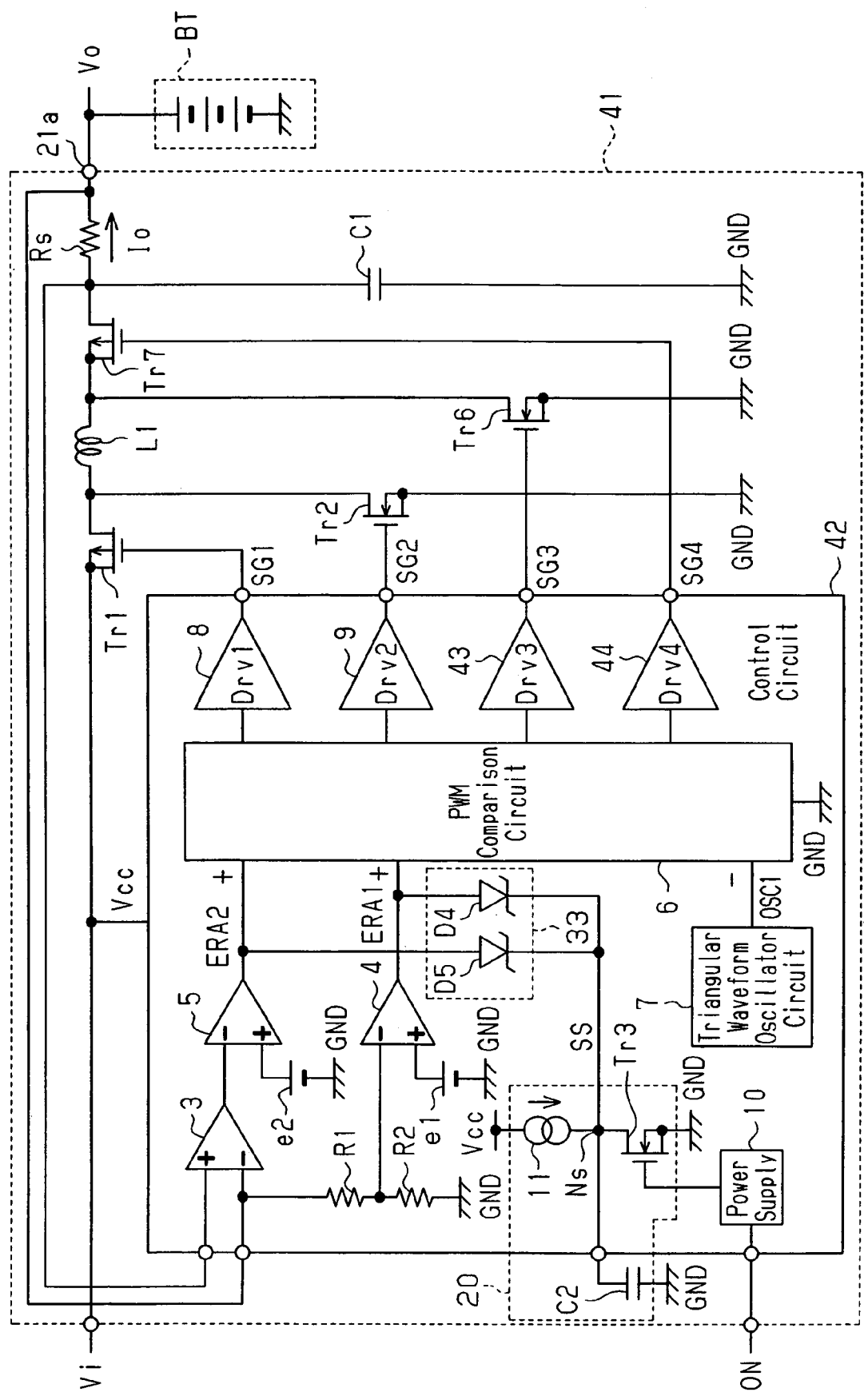
FIG. 9 is a schematic block diagram of a DC-DC converter according to a third embodiment of the present invention.

The DC-DC converter 41 of the third embodiment shown in FIG. 9 is configured by changing the voltage step-down configuration of the DC-DC converter 31 in the second embodiment (refer to FIG. 8) to a voltage step-up/step-down configuration. The other components of the DC-DC converter 41 are the same as the corresponding components in the second embodiment.

In detail, the DC-DC converter 41 of the third embodiment includes, in addition to the components of the DC-DC converter 31 of the second embodiment, transistors Tr6 and Tr7 and third and fourth output circuits 43 and 44 (Drv3 and Drv4). The third output circuit 43 is connected to the PWM comparison circuit 6 and the transistor Tr6. The third output circuit 43 controls on and off of the transistor Tr6 according to output pulses of the PWM comparison circuit 6. The fourth output circuit 44 is connected to the PWM comparison circuit 6 and the transistor Tr7. The fourth output circuit 44 controls on and off of the transistor Tr7 according to output pulses of the PWM comparison circuit 6. The control circuit 42 of the third embodiment has the same configuration as that of the control circuit 32 of the second embodiment except that the control circuit 42 additionally includes the third and fourth output circuits 43 and 44.

The transistor Tr6 is an NMOS-FET. The transistor Tr7 is a PMOS-FET. The transistor Tr7 is connected between the choke coil L1 and the current sense resistor Rs. The transistor Tr6 has a drain terminal connected to the connecting node between the transistor Tr7 and the choke coil L1, and a source terminal connected to the ground GND. The transistor Tr7 is controlled to go on and off by a drive signal SG4, which is provided from the fourth output circuit 44. The transistor Tr6 is controlled to go on and off by a drive signal SG3, which is provided from the third output circuit 43, so that the transistor Tr6 is on while the transistor Tr7 is off. The step-up/step-down voltage DC-DC converter 41 has the same advantages as the DC-DC converter 31 of the second embodiment.

Fourth Embodiment

A DC-DC converter 51 according to a fourth embodiment of the present invention will now be described with reference to FIG. 10.

Figure 10:
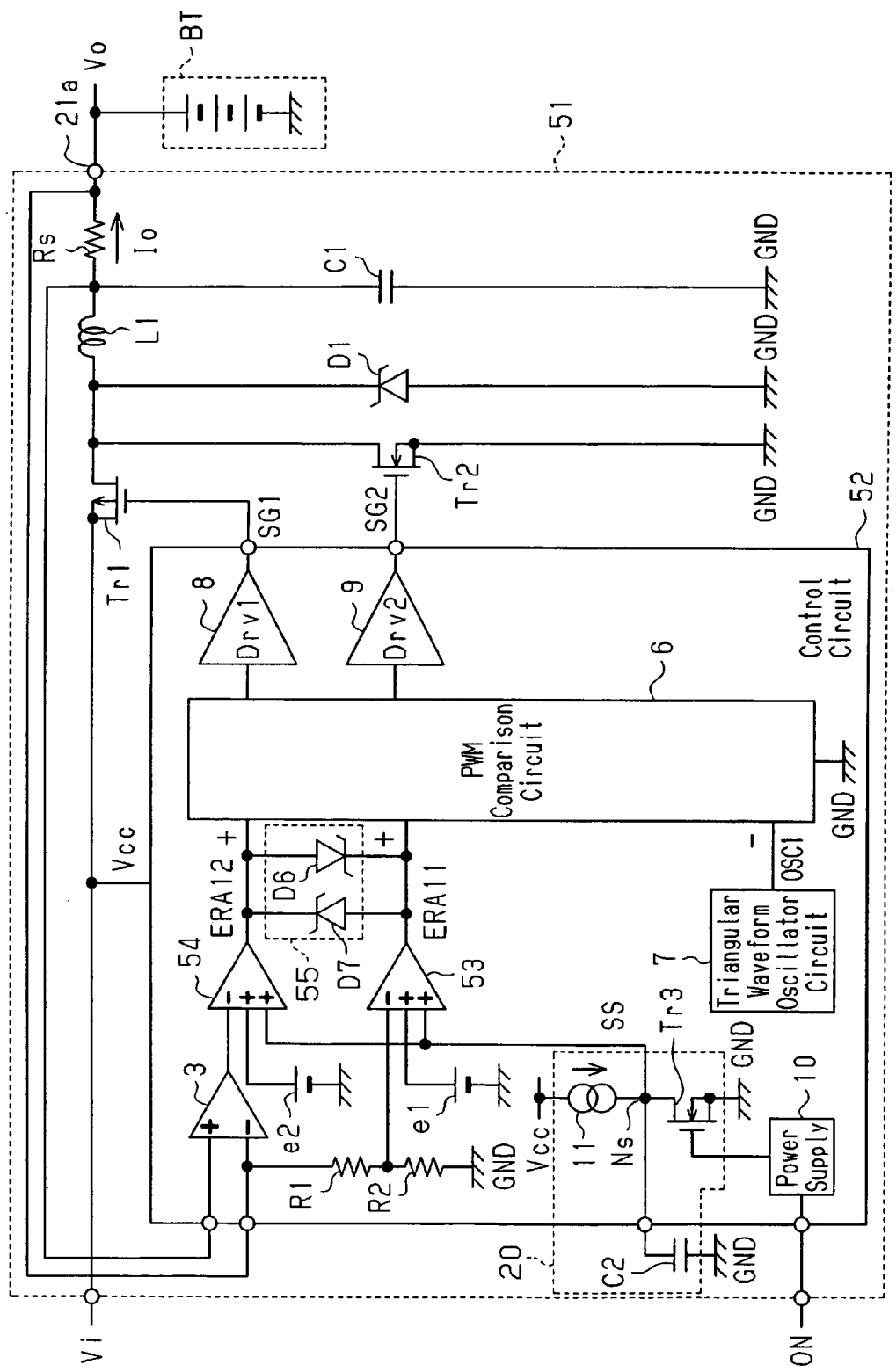
FIG. 10 is a schematic block diagram of a DC-DC converter according to a fourth embodiment of the present invention.

The DC-DC converter 51 of the fourth embodiment shown in FIG. 10 is configured by respectively replacing the first and second error amplification circuits 4 and 5 in the DC-DC converter 21 of the first embodiment (refer to FIG. 5) with three-input configuration error amplification circuits (first and second error amplification circuits 53 and 54) for receiving the soft start signal SS.

The first and second error amplification circuits 53 and 54 are voltage amplification circuits each having one inversion input terminal and two non-inversion input terminals. Each of the first and second error amplification circuits 53 and 54 amplifies the voltage difference between the lower one of the voltages supplied to its two non-inversion input terminals and the voltage supplied to its inversion input terminal and then outputs the amplified voltage.

To be specific, in the first error amplification circuit 53, the inversion input terminal is supplied with a divisional voltage generated as the resistors R1 and R2 divide the output voltage Vo. In the first error amplification circuit 53, one of the two non-inversion input terminals is supplied with the reference voltage e1, and the soft start signal SS is supplied to the other one of its two non-inversion input terminals. In the second error amplification circuit 54, the inversion input terminal is supplied with the output voltage of the voltage amplification circuit 3 that is generated by amplifying the voltage between the two terminals of the current sense resistor Rs. In the second error amplification circuit 54, one of the two non-inversion input terminals is supplied with the reference voltage e2, and the soft start signal SS is provided to the other one of the two non-inversion input terminals.

A diode D6 (clamp element) and a diode D7 (clamp element) are connected between output terminals of the error amplification circuits 53 and 54. The diodes D6 and D7 are Schottky barrier diodes in the fourth embodiment. The cathode of the diode D6 is connected to the output terminal of the first error amplification circuit 53, and the anode of the diode D6 is connected to the output terminal of the second error amplification circuit 54. The cathode of the diode D7 is connected to the output terminal of the second error amplification circuit 54, and the anode of the diode D7 is connected to the output terminal of the first error amplification circuit 53.

The DC-DC converter 51 configured in this manner controls its output voltage Vo based on the voltage of the soft start signal SS while the voltage of the soft start signal SS supplied to the first error amplification circuit 53 is lower than the reference voltage e1. The DC-DC converter 51 controls its output current Io based on the voltage of the soft start signal SS while the voltage of the soft start signal SS supplied to the second error amplification circuit 54 is lower than the reference voltage e2.

In the fourth embodiment, the output voltage Vo and the output current Io of the DC-DC converter 51 are controlled to gradually rise from 0 V and 0 A, respectively. When the voltage of the soft start signal SS rises above the reference voltage e1, the first error amplification circuit 53 amplifies the voltage difference between the divisional voltage generated by dividing the output voltage Vo with the resistors R1 and R2 and the reference voltage e1. When the voltage of the soft start signal SS rises above the reference voltage e2, the second error amplification circuit 54 amplifies the voltage difference between the output voltage of the voltage amplification circuit 3 and the reference voltage e2.

When the DC-DC converter 51 is used as a circuit for charging the battery BT, the output voltage Vo gradually rises as the voltage of the soft start signal SS rises, whereas the output current Io remains substantially at 0 A until the output voltage Vo exceeds the voltage of the battery BT. When the charge current (i.e., the output current Io) flows through the current sense resistor Rs, the output current Io is finally set at a current value (e.g., 3 A) determined by the reference voltage e2. Before the output voltage Vo exceeds the voltage of the battery BT and the charge current (i.e., the output current Io) starts flowing, the second error amplification circuit 54 attempts to set the voltage of the output signal ERA12 to a maximum voltage.

In the fourth embodiment, however, the diode D7 (clamp element) clamps the voltage of the output signal ERA12 of the second error amplification circuit 54 to a voltage value higher than the voltage of the output signal ERA11 of the first error amplification circuit 53 by an amount corresponding to the threshold voltage of the diode D7. Here, the voltage of the output signal ERA11 of the first error amplification circuit 53 is set at a minimum voltage value before the voltage of the soft start signal SS reaches the reference voltage e1. When the voltage of the soft start signal SS rises above the reference voltage e1, the voltage of the output signal ERA11 is set at a voltage value obtained by amplifying the voltage difference between the divisional voltage of the output voltage Vo and the reference voltage e1 as described above. The voltage of the output signal ERA12 is not set at a maximum voltage value when the output control is switched to the constant current control during activation of the DC-DC converter 51. As in the first embodiment, the DC-DC converter 51 of the fourth embodiment promptly switches its output control to the constant current control without delay and suppresses generation of an inrush current.

Fifth Embodiment

A DC-DC converter 61 according to a fifth embodiment of the present invention will now be described with reference to FIG. 11.

Figure 11:
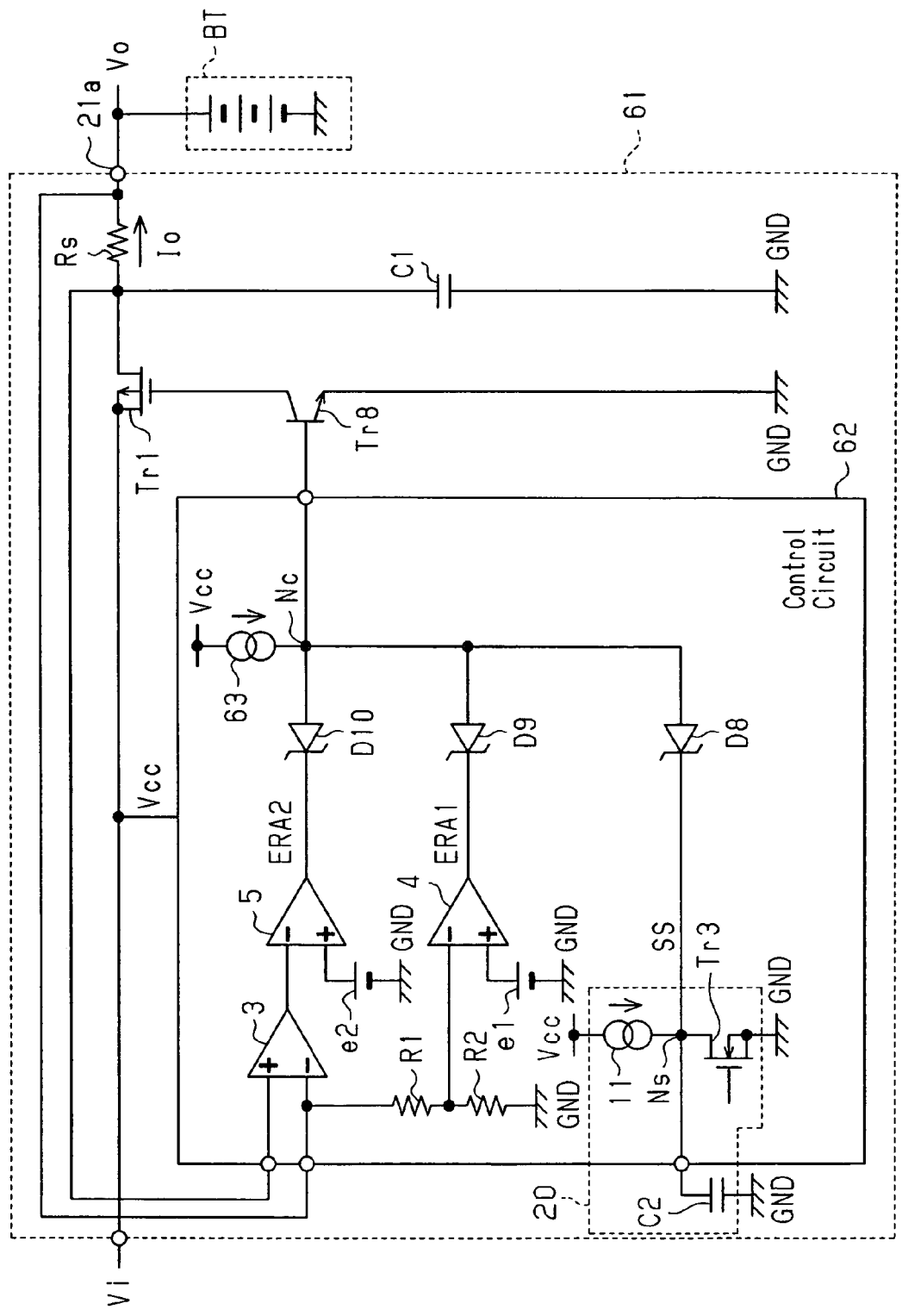
FIG. 11 is a schematic block diagram of a DC-DC converter according to a fifth embodiment of the present invention.

The DC-DC converter 61 of the fifth embodiment shown in FIG. 11 is formed by changing the switching type DC-DC converter 21 of the first embodiment (FIG. 1) to a linear-regulator (voltage step-down) configuration.

The control circuit 62 of the DC-DC converter 61 includes diodes D8 to D10, and a constant current circuit 63. The cathode of the diode D8 is connected to the connecting node Ns between the constant current circuit 11 and the transistor Tr3. The anode of the diode D8 is connected to the constant current circuit 63. The cathode of the diode D9 is connected to the output terminal of the first error amplification circuit 4. The anode of the diode D9 is connected to the constant current circuit 63. The diodes D8 to D10 are Schottky barrier diodes in the fifth embodiment. As in the first embodiment, an external signal (not shown) controls the transistor Tr3 in the control circuit 62 to be off when the DC-DC converter 61 is operating, and to be on when the DC-DC converter 61 stops operating.

The transistor Tr8 is a control transistor configured by an NPN bipolar transistor. The transistor Tr8 has a base terminal connected to a connecting node Nc between the constant current circuit 63 and each of the diodes D8 to D10, an emitter terminal connected to the ground GND, and a collector terminal connected to the gate terminal of the transistor Tr1. The transistor Tr8 continuously controls the output of the DC-DC converter 61 by driving the transistor Tr1 according to the voltage level of the connecting node Nc.

In the DC-DC converter 61, the diode D8 operates as a clamp element. During activation of the DC-DC converter 61, the diode D8 clamps the voltage of the connecting node Nc to voltage higher than the voltage of the soft start signal SS by an amount corresponding to the threshold voltage of the diode D8. Thus, the DC-DC converter 61 with the linear-regulator configuration has the same advantage as the DC-DC converter 21 of the first embodiment.

Sixth Embodiment

Figure 12:
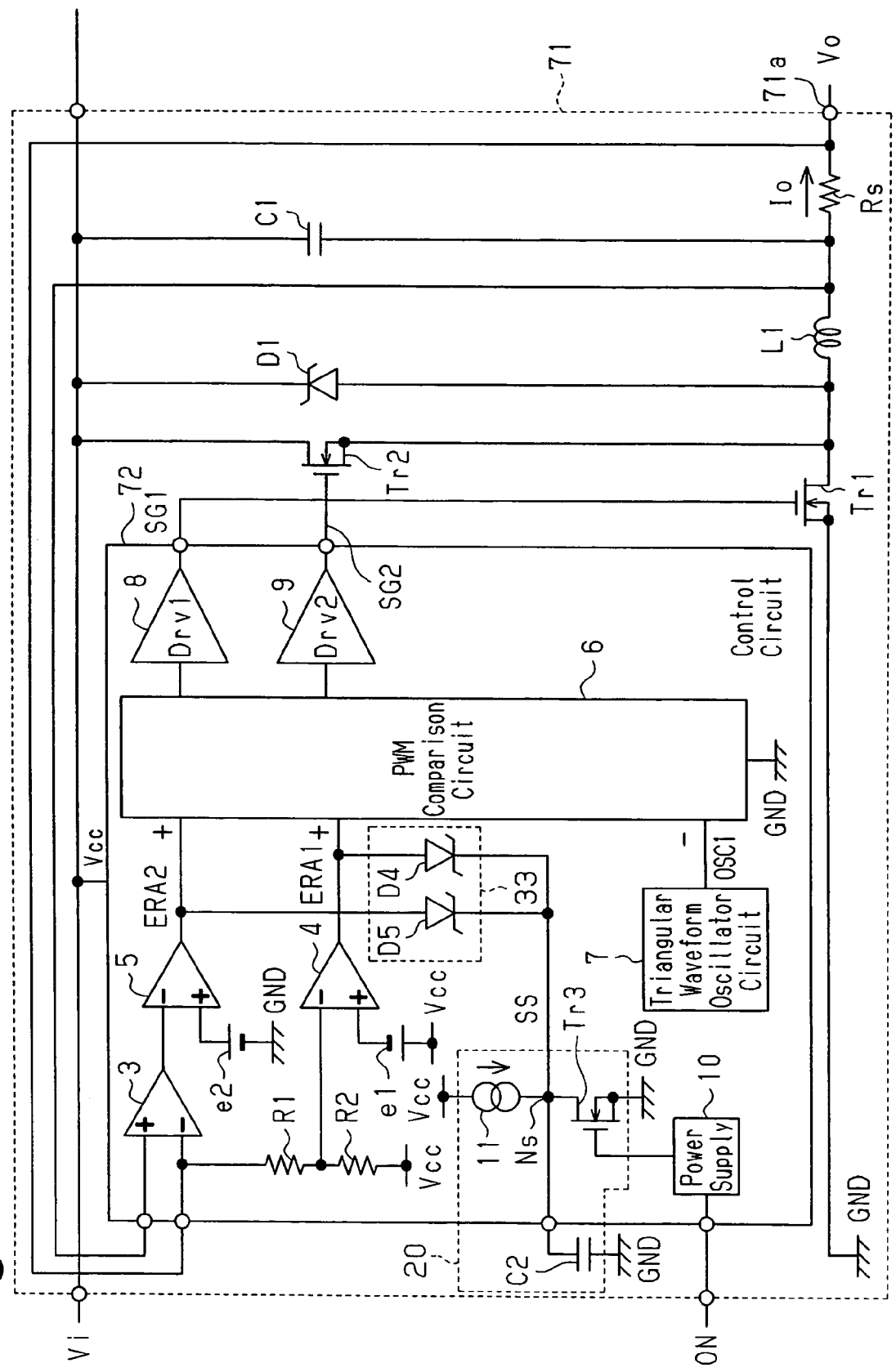
FIG. 12 is a schematic block diagram of a DC-DC converter according to a sixth embodiment of the present invention.

A DC-DC converter 71 according to a sixth embodiment of the present invention will now be described with reference to FIG. 12.

The DC-DC converter 71 of the sixth embodiment controls the potential at the negative terminal of the battery BT (secondary battery). To be specific, an output terminal 71a of the DC-DC converter 71 is connected to a negative polarity terminal of the battery BT (not shown in FIG. 12) in FIG. 12. The first error amplification circuit 4 detects negative voltage of the battery BT, amplifies the voltage difference between the negative terminal voltage (specifically, a negative divisional voltage) and the reference voltage e1, and outputs the amplified voltage.

In the sixth embodiment, the clamp circuit 33 that clamps the output signals ERA1 and ERA2 of the first and second error amplification circuits 4 and 5 to the voltage of the soft start signal SS includes diodes D4 and D5 as in the second embodiment. The DC-DC converter 71 of negative polarity charging control type has the same advantages as the DC-DC converter 31 of the second embodiment.

Seventh Embodiment

An AC-DC converter 81 according to a seventh embodiment of the present invention will now be described with reference to FIGS. 13 and 14. The seventh embodiment describes a case in which an AC-DC converter of constant voltage, constant current control type, which is mounted on the AC adaptor 13 (refer to FIG. 7), includes the clamp circuit (specifically the clamp elements forming the clamp circuit) described in each of the above embodiments.

Figure 13:
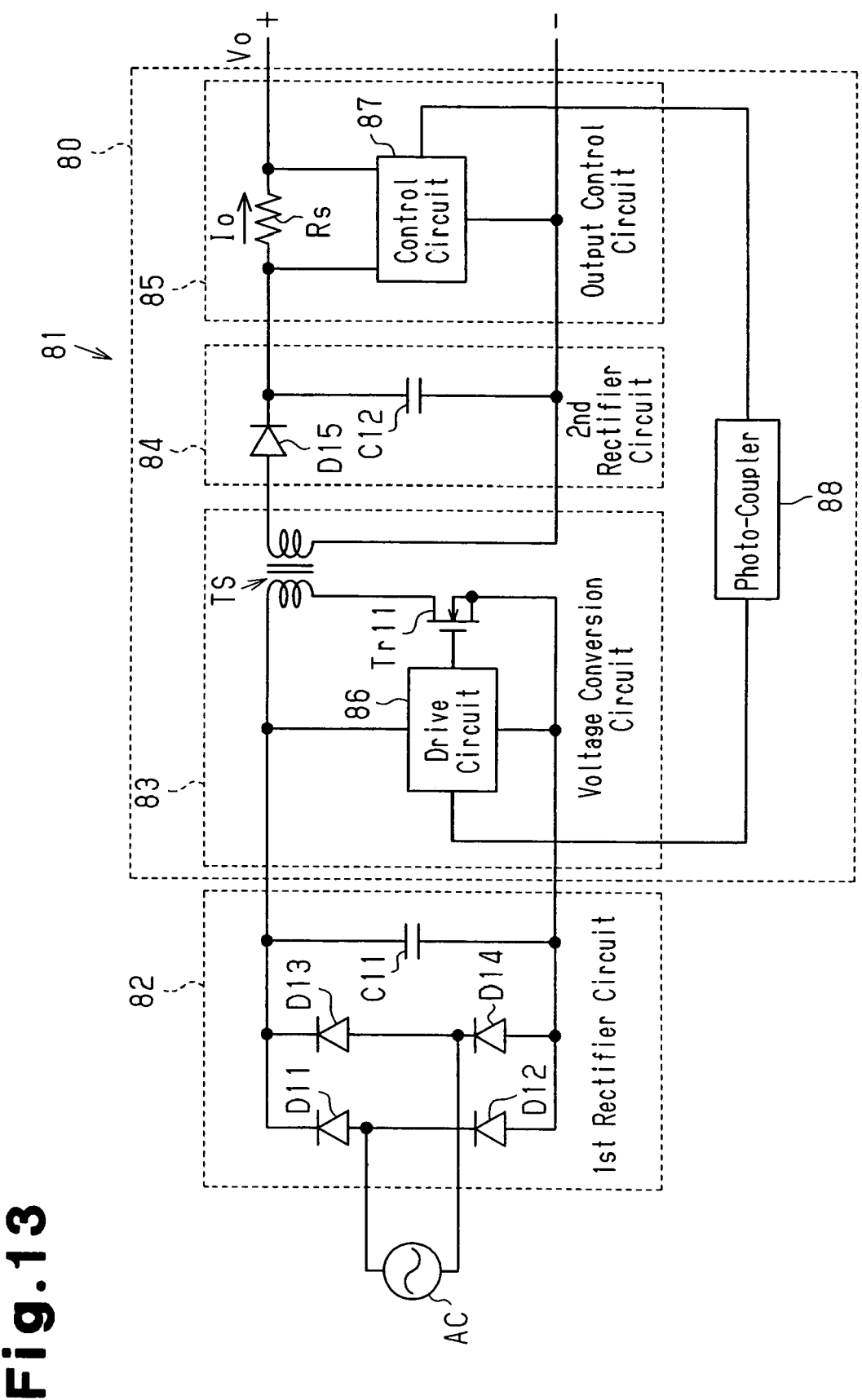
FIG. 13 is a schematic block diagram showing an overall configuration of an AC-DC converter according to a seventh embodiment of the present invention.

As shown in FIG. 13, the AC-DC converter 81 includes a first rectifier circuit 82, a voltage conversion circuit 83, a second rectifier circuit 84, and an output control circuit 85.

The first rectifier circuit 82 includes a bridge diode, which is configured by diodes D11 to D14, and a capacitor C11. The first rectifier circuit 82 converts an alternating current voltage, which is provided from an AC (alternating current) power supply, to a direct current voltage. The voltage conversion circuit 83 includes a transformer TS, a drive circuit 86, and a main switching transistor Tr11. The drive circuit 86 controls the transistor Tr11 according to feedback control executed by the output control circuit 85. The transistor Tr11 is an NMOS-FET. The second rectifier circuit 84 includes a diode D15 for rectification purposes, and a capacitor C12. The second rectifier circuit 84 smoothes voltage transmitted via the transformer TS, and transmits the smoothed voltage to the output control circuit 85.

The output control circuit 85 includes a control circuit 87 and a current sense resistor Rs. The control circuit 87 detects output voltage Vo and voltage between the two terminals of the resistor Rs, which is generated by the current (output current Io) flowing through the current sense resistor Rs in the AC-DC converter 81. Further, the control circuit 87 generates various control signals based on the output voltage Vo and the output current Io, and provides the drive circuit 86 of the voltage conversion circuit 83 with the generated control signals. A photo-coupler 88, which includes a photodiode and a photo transistor, is connected between the output control circuit 85 and the voltage conversion circuit 83 (specifically between the control circuit 87 and the drive circuit 86). The voltage conversion circuit 83, the second rectifier circuit 84, the output control circuit 85, and the photo-coupler 88 configure a semiconductor device 80.

Figure 14:
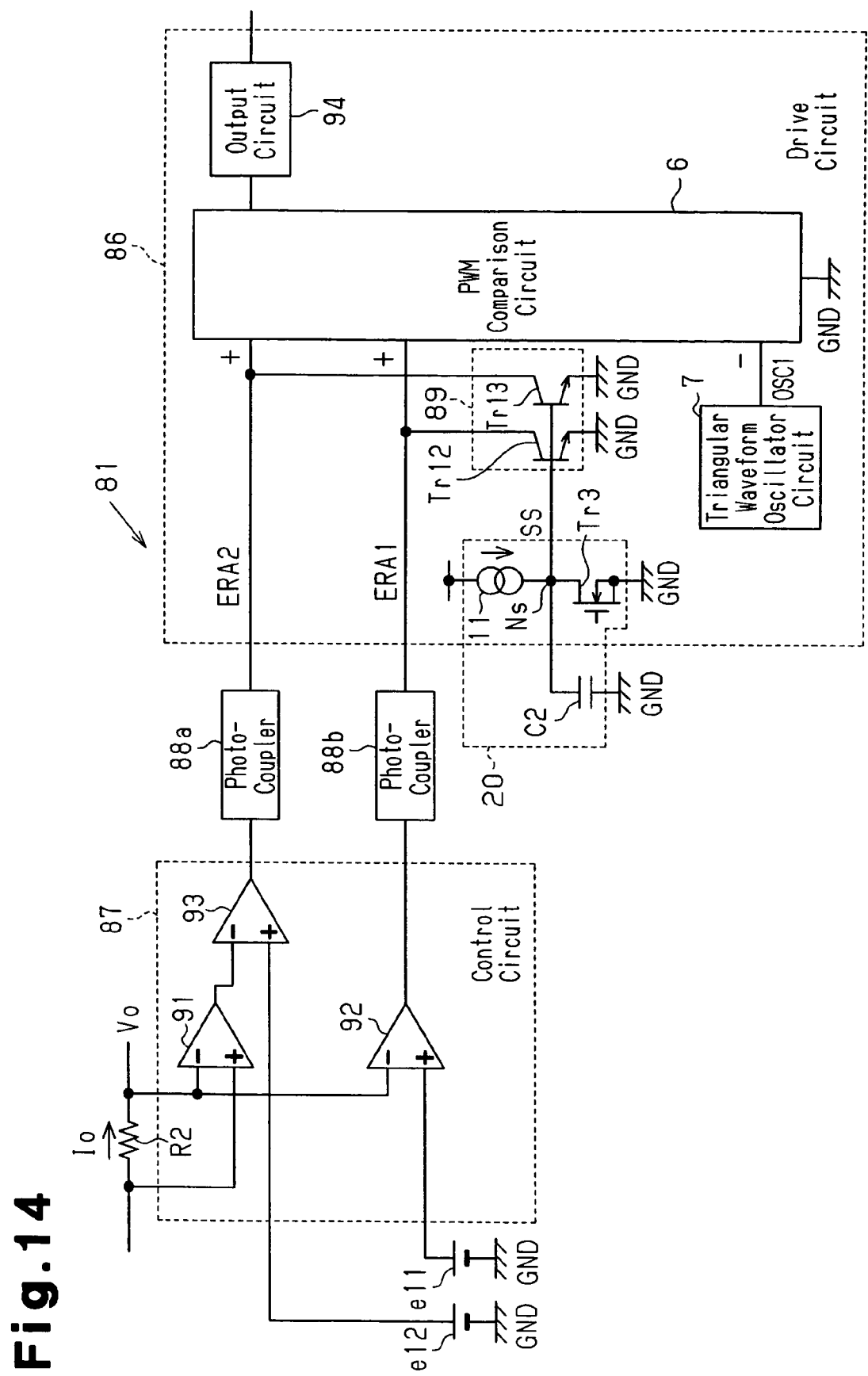
FIG. 14 is a schematic block diagram showing a specific configuration of the AC-DC converter of FIG. 13.

FIG. 14 is a schematic block diagram showing the configuration of the drive circuit 86 and the control circuit 87.

The control circuit 87 includes a voltage amplification circuit 91 and first and second error amplification circuits 92 and 93. The first error amplification circuit 92 outputs voltage obtained by amplifying voltage difference between the output voltage Vo of the AC-DC converter 81 and a reference voltage e11. The voltage amplification circuit 91 amplifies the voltage between the two terminals of the current sense resistor Rs and supplies the second error amplification circuit 93 with the amplified voltage. The second error amplification circuit 93 amplifies the voltage difference between the output voltage of the voltage amplification circuit 91 and a reference voltage e12, and outputs the amplified voltage. The reference voltage e11 is set in correspondence with the output voltage Vo determined by the constant voltage operation. The reference voltage e12 is set in correspondence with the output current Io determined by the constant current operation. The output signal ERA1 of the error amplification circuit 92 is provided to the drive circuit 86 via the photo-coupler 88b. The output signal ERA2 of the error amplification circuit 93 is provided to the drive circuit 86 via the photo-coupler 88a.

The drive circuit 86 includes a PWM comparison circuit 6, a triangular waveform oscillator circuit 7, an output circuit 94, transistors Tr12 and Tr13, a constant current circuit 11, a transistor Tr3, and a capacitor C2. The transistors Tr12 and Tr13 form a clamp circuit 89. The constant current circuit 11, the transistor Tr3, and the capacitor C2 from a soft start circuit 20. The capacitor C2 is an external element. The drive circuit 86 is a single chip semiconductor device.

In the drive circuit 86, each of the transistors Tr12 and Tr13 is an NPN bipolar transistor that configures a common emitter circuit. Each of the transistors Tr12 and Tr13 has a base terminal, which is provided with a soft start signal SS, and an emitter terminal connected to the ground GND. The transistor Tr12 has a collector terminal connected to the output terminal of the first error amplification circuit 92 via the photo-coupler 88b. The transistor Tr13 has a collector terminal connected to the output terminal of the second error amplification circuit 93 via the photo-coupler 88a. Each of the transistors Tr12 and Tr13 may be a PNP bipolar transistor that configures an emitter follower as in the first embodiment. The other components of the drive circuit 86 are substantially the same as the corresponding components of the control circuit 22 in the first embodiment (refer to FIG. 5) and will not be described in detail.

The PWM comparison circuit 6 performs voltage pulse width modulation based on the voltage of the triangular waveform signal OSC1 supplied to its inversion input terminal and the lower one of the voltages of the output signals ERA1 and ERA2 supplied to its two non-inversion input terminals. The PWM comparison circuit 6 provides pulses, generated in this way, to the output circuit 94. The output circuit 94 controls the main switching transistor Tr11 (refer to FIG. 13) according to the pulses provided from the PWM comparison circuit 6.

In the AC-DC converter 81, the transistors Tr12 and Tr14 clamp, during activation of the AC-DC converter 81, the voltages of the output signals ERA1 and ERA2 of the error amplification circuits 92 and 93 to substantially the same voltages as the voltage of the soft start signal SS, as in the DC-DC converter 21 of the first embodiment (refer to FIG. 5). This configuration suppresses generation of an inrush current during activation of the AC-DC converter 81.

Eighth Embodiment

An AC-DC converter 101 according to an eighth embodiment of the present invention will now be described with reference to FIG. 15.

Figure 15:
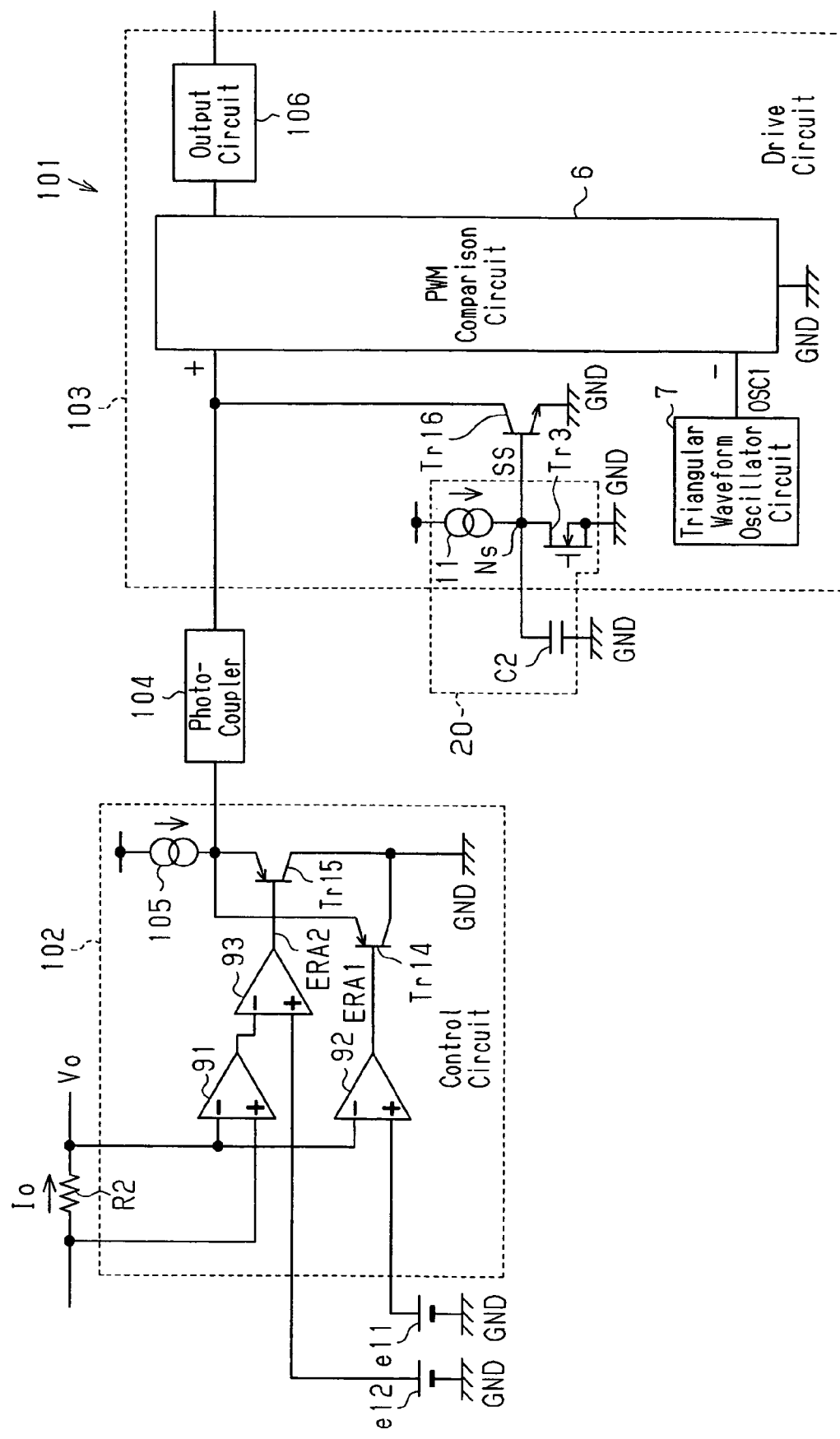
FIG. 15 is a schematic block diagram of an AC-DC converter according to an eighth embodiment of the present invention.

The AC-DC converter 101 of the eighth embodiment shown in FIG. 15 is configured by replacing the control circuit 87 and the drive circuit 86 of the AC-DC converter 81 of the seventh embodiment (refer to FIG. 14) with a control circuit 102 and a drive circuit 103 connected by one photo-coupler 104. The other components of the AC-DC converter 101 of the eighth embodiment are the same as the corresponding components in the seventh embodiment.

As shown in FIG. 15, the control circuit 102 includes, in addition to the components of the control circuit 87 described above (refer to FIG. 14), a constant current circuit 105 and transistors Tr14 and Tr15 (PNP bipolar transistors). The drive circuit 103 is provided with a signal generated by synthesizing the output signals ERA1 and ERA2 of the first and second error amplification circuits 92 and 93 via the photo-coupler 104.

The drive circuit 103 is a single chip semiconductor device having substantially the same configuration as the drive circuit 86 (refer to FIG. 14). The drive circuit 103 differs from the drive circuit 86 in the seventh embodiment in that its clamp circuit is formed by one transistor Tr16. The transistor Tr16 is an NPN bipolar transistor as in the seventh embodiment. The AC-DC converter 101 of the eighth embodiment has the same advantages as the AC-DC converter 81 of the seventh embodiment. Further, the AC-DC converter 101 uses one photo coupler. This enables the clamp circuit to be formed by one transistor Tr16 (clamp element) and reduces the circuit scale.

It should be apparent to those skilled in the art that the present invention may be embodied in many other specific forms without departing from the spirit or scope of the invention. Particularly, it should be understood that the present invention may be embodied in the following forms.

In the first embodiment, the transistors Tr4 and Tr5 (clamp elements) are arranged in the control circuit 22. However, the transistors Tr4 and Tr5 may be arranged outside the control circuit 22. This enables an existing control circuit to be used. In the same manner, the clamp elements may be arranged outside the control circuit in the other embodiments. In other words, the clamp elements may be external elements.

In the above embodiments, a bipolar transistor that functions as a clamp element arranged in the control circuit may be replaced by a diode. On the contrary, a diode that functions as a clamp element arranged in the control circuit may be replaced by a bipolar transistor. This would also realize the same function as the clamp element.

In the above embodiments, the present invention is applied to the DC-DC converter or AC-DC converter of constant voltage, constant current control type. However, the present invention is widely applicable to another DC-DC converter or AC-DC converter for controlling its output using control signals of two or more inputs (voltage control signals or current control signals).

In the first to third, sixth, and seventh embodiments, the clamp elements (bipolar transistors or diodes), which are connected individually to the output terminal of the first error amplification circuit and the output terminal of the second error amplification circuit, may be replaced by one clamp element, which is commonly connected to the output terminals of these error amplification circuits. To realize this configuration, the output signals of the error amplification circuits are synthesized by one constant current circuit, and the voltage of the resulting output signal is clamped to the voltage of the soft start signal SS by one clamp element, as in the eighth embodiment.

In the first embodiment, the control circuit 22 includes the clamp circuit 23 having the transistors Tr4 and Tr5, each of which forms an emitter follower. The control circuit 22 may include, instead of the clamp circuit 23, a clamp circuit 89 shown in FIG. 14. The clamp circuit 89 has NPN bipolar transistors Tr12 and Tr13, each of which configures a common emitter circuit.

The present examples and embodiments are to be considered as illustrative and not restrictive, and the invention is not to be limited to the details given herein, but may be modified within the scope and equivalence of the appended claims.

What is claimed is:

1. A control circuit for controlling output of a DC-DC converter with a plurality of control signals, the control circuit comprising:
    a plurality of error amplification circuits, each generating a control signal based on a difference between a reference voltage and voltage derived from an output that is to be controlled;
    a soft start circuit for generating a soft start signal, the soft start signal having voltage lower than voltage of each of the control signals and being used to control the output of the DC-DC converter when the DC-DC converter is activated; and
    a clamp circuit, connected to the error amplification circuits, for receiving the control signals from the error amplification circuits and clamping the voltage of each of the control signals to substantially the same voltage as the soft start signal in at least the period from when the DC-DC converter is activated to when the controlling of the output of the DC-DC converter is switched from the soft start signal to one of the plurality of control signals.

2. The control circuit according to claim 1, further comprising:
    a triangular waveform oscillator circuit for generating a triangular waveform signal; and a pulse-width modulation comparison circuit, connected to the error amplification circuits and the triangular waveform oscillator circuit, for generating a pulse signal based on the triangular waveform signal and the one of the control signals and the soft start signal having the lowest potential;

wherein the DC-DC converter includes a main switching transistor connected to the pulse-width modulation comparison circuit and having an on/off ratio controlled by the pulse signal to control the output of the DC-DC converter.

3. The control circuit according to claim 1, wherein the DC-DC converter includes a control transistor that is driven by the control signals and the soft start signal to continuously control the output of the DC-DC converter.

4. The control circuit according to claim 1, wherein the DC-DC converter receives an input voltage and lowers the input voltage in accordance with the control signals and the soft start signal to generate output voltage.

5. The control circuit according to claim 1, wherein the DC-DC converter receives an input voltage and lowers or raises the input voltage in accordance with the control signals and the soft start signal to generate output voltage.

6. The control circuit according to claim 1, wherein the control signals include at least one voltage control signal, for controlling output voltage of the DC-DC converter to a substantially constant voltage, and at least one current control signal, for controlling an output current of the DC-DC converter to a substantially constant current.

7. The control circuit according to claim 1, wherein the DC-DC converter is a charger, connected to a secondary battery including a positive terminal and a negative terminal, for controlling positive polarity potential or negative polarity potential of the secondary battery using the output of the DC-DC converter controlled by the control signals.

8. The control circuit according to claim 1, wherein the plurality of error amplification circuits include:
a first error amplification circuit; and
a second error amplification circuit, wherein the clamp circuit includes:
a diode having a cathode connected to an output of the first error amplification circuit and an anode connected to an output of the second error amplification circuit; and
a diode having an anode connected to the output of the first error amplification circuit and a cathode connected to the output of the second error amplification circuit.

9. The control circuit according to claim 1, wherein the clamp circuit includes a plurality of clamp elements, each connected to an output of an associated one of the error amplification circuits.

10. The control circuit according to claim 9, wherein each of the clamp elements includes a PNP bipolar transistor having a base responsive to the soft start signal, a collector connected to ground, and an emitter connected to the output of the associated one of the error amplification circuits.

11. The control circuit according to claim 9, wherein each of the clamp elements includes an NPN bipolar transistor having a base responsive to the soft start signal, an emitter connected to ground, and a collector connected to the output of the associated one of the error amplification circuits.

12. The control circuit according to claim 9, wherein each of the clamp elements includes a diode having an anode, connected to the output of the associated one of the error amplification circuits, and a cathode, responsive to the soft start signal.

13. The control circuit according to claim 1, wherein the clamp circuit includes a clamp element connected commonly to the outputs of the error amplification circuits.

14. The control circuit according to claim 13, wherein the clamp element includes a PNP bipolar transistor having a base responsive to the soft start signal, a collector connected to ground, and an emitter connected to the outputs of the error amplification circuits.

15. The control circuit according to claim 13, wherein the clamp element includes an NPN bipolar transistor having a base responsive to the soft start signal, an emitter connected to ground, and a collector connected to the outputs of the error amplification circuits.

16. The control circuit according to claim 13, wherein the clamp element includes a diode having an anode, connected to the outputs of the error amplification circuits, and a cathode, responsive to the soft start signal.

17. A control circuit for controlling output of a DC-DC converter with a plurality of control signals, the control circuit comprising:
a plurality of error amplification circuits, each generating a control signal based on a difference between a reference voltage and voltage derived from an output that is to be controlled;
a soft start circuit for generating a soft start signal, the soft start signal having voltage lower than voltage of each of the control signals and being used to control the output of the DC-DC converter when the DC-DC converter is activated; and
a clamp circuit, connected to the error amplification circuits, for receiving the control signals from the error amplification circuits and clamping the voltage of each of the control signals to voltage greater than that of the soft start signal by a predetermined amount in at least the period from when the DC-DC converter is activated to when the controlling of the output of the DC-DC converter is switched from the soft start signal to one of the plurality of control signals.

18. A semiconductor device for controlling output of a DC-DC converter or an AC-DC converter with a plurality of control signals, wherein the semiconductor device is connected to a capacitor, the semiconductor device comprising:
a plurality of error amplification circuits, each generating a control signal based on a difference between a reference voltage and voltage derived from an output that is to be controlled; and
a soft start circuit for charging the capacitor during operation of the DC-DC converter or the AC-DC converter and generating a soft start signal having voltage equal to that between two terminals of the capacitor, the soft start signal having voltage lower than voltage of each of the control signals and being used to control the output of the DC-DC converter when the DC-DC converter is activated; and
a clamp circuit, connected to the error amplification circuits, for receiving the control signals from the error amplification circuits and clamping the voltage of each of the control signals to substantially the same voltage as the soft start signal in at least the period from when the DC-DC converter is activated to when the controlling of the output of the DC-DC converter is switched from the soft start signal to one of the plurality of control signals.

19. A DC-DC converter comprising a control circuit for controlling output of the DC-DC converter with a plurality of control signals, the control circuit including:
a plurality of error amplification circuits, each generating a control signal based on a difference between a reference voltage and voltage derived from an output that is to be controlled;

a soft start circuit for generating a soft start signal, the soft start signal having voltage lower than voltage of each of the control signals and being used to control the output of the DC-DC converter when the DC-DC converter is activated; and a clamp circuit, connected to the error amplification circuits, for receiving the control signals from the error amplification circuits and clamping the voltage of each of the control signals to substantially the same voltage as the soft start signal in at least the period from when the DC-DC converter is activated to when the controlling of the output of the DC-DC converter is switched from the soft start signal to one of the plurality of control signals.

20. A battery pack comprising:

a DC-DC converter including a control circuit for controlling output of the DC-DC converter with a plurality of control signals; and a battery connected to and charged by the DC-DC converter, the control circuit including:

a plurality of error amplification circuits, each generating a control signal based on a difference between a reference voltage and voltage derived from an output that is to be controlled;

a soft start circuit for generating a soft start signal, the soft start signal having voltage lower than voltage of each of the control signals and being used to control the output of the DC-DC converter when the DC-DC converter is activated; and a clamp circuit, connected to the error amplification circuits, for receiving the control signals from the error amplification circuits and clamping the voltage of each of the control signals to substantially the same voltage as the soft start signal in at least the period from when the DC-DC converter is activated to when the controlling of the output of the DC-DC converter is switched from the soft start signal to one of the plurality of control signals.

21. An electronic device comprising a DC-DC converter including a control circuit for controlling output of the DC-DC converter with a plurality of control signals, the control circuit including:

a plurality of error amplification circuits, each generating a control signal based on a difference between a reference voltage and voltage derived from an output that is to be controlled;

a soft start circuit for generating a soft start signal, the soft start signal having voltage lower than voltage of each of the control signals and being used to control the output of the DC-DC converter when the DC-DC converter is activated; and a clamp circuit, connected to the error amplification circuits, for receiving the control signals from the error amplification circuits and clamping the voltage of each of the control signals to substantially the same voltage as the soft start signal in at least the period from when the DC-DC converter is activated to when the controlling of the output of the DC-DC converter is switched from the soft start sicinal to one of the plurality of control signals.

22. A method for controlling output of a DC-DC converter with a plurality of control signals, the method comprising:

generating, in a plurality of error amplification circuits, a plurality of control signals based on a difference between a reference voltage and a voltage derived from an output that is to be controlled;

generating a soft start signal having a voltage lower than a voltage of each of the control signals and being used to control the output of the DC-DC converter when the DC-DC converter is activated;

receiving the control signals from the plurality of error amplification circuits; and clamping the voltage of each of the control signals to substantially the same voltage as the soft start signal in at least the period from when the DC-DC converter is activated to when the controlling of the output of the DC-DC converter is switched from the soft start signal to one of the plurality of control signals.

23. The method according to claim 22, wherein the DC-DC converter has a plurality of error amplification circuits and a clamp circuit including a plurality of clamp elements, each connected to an output of an associated one of the error amplification circuits, wherein:

said generating a plurality of control signals includes providing each of the error amplification circuits with a feedback voltage and a reference voltage to generate the control signals; and said clamping the voltage of each of the control signals includes providing the clamp circuit with the soft start signal to clamp the voltage of each of the control signals.

24. The method according to claim 22, wherein the DC-DC converter includes a plurality of error amplification circuits, and a clamp circuit including a clamp element commonly connected to outputs of the error amplification circuits, wherein:

said generating a plurality of control signals includes providing each of the error amplification circuits with a feedback voltage and a reference voltage to generate the control signals; and said clamping the voltage of each of the control signals includes providing the clamp circuit with the soft start signal to clamp the voltage of each of the control signals.

25. The method according to claim 22, wherein the DC-DC converter includes a main switching transistor, the method further comprising:

generating a triangular waveform signal;

comparing the one of the control signals and the soft start signal having the lowest potential with the triangular waveform signal to generate a pulse signal; and controlling an on/off ratio of the main switching transistor using the pulse signal to control the output of the DC-DC converter.

26. The method according to claim 22, wherein said generating a plurality of control signals includes generating at least one voltage control signal, for controlling output voltage of the DC-DC converter to a substantially constant voltage, and at least one current control signal, for controlling an output current of the DC-DC converter to a substantially constant current.

27. The method according to claim 22, wherein the DC-DC converter is connected to a secondary battery including a positive terminal and a negative terminal, the method further comprising:

controlling positive polarity potential or negative polarity potential of the secondary battery using the output of the DC-DC converter controlled by the control signals.

* * * * *